(12) United States Patent
Griffith

(10) Patent No.: US 12,292,870 B2
(45) Date of Patent: May 6, 2025

(54) DETERMINING A DEGREE OF SIMILARITY OF A SUBSET OF TABULAR DATA ARRANGEMENTS TO SUBSETS OF GRAPH DATA ARRANGEMENTS AT INGESTION INTO A DATA-DRIVEN COLLABORATIVE DATASET PLATFORM

(71) Applicant: data.world, Inc., Austin, TX (US)

(72) Inventor: David Lee Griffith, Austin, TX (US)

(73) Assignee: data.world, Inc., Austin, TX (US)

( * ) Notice: Subject to any disclaimer, the term of this patent is extended or adjusted under 35 U.S.C. 154(b) by 0 days.

(21) Appl. No.: 17/365,214

(22) Filed: Jul. 1, 2021

(65) Prior Publication Data
US 2022/0405292 A1 Dec. 22, 2022

Related U.S. Application Data

(63) Continuation of application No. 16/137,297, filed on Sep. 20, 2018, now Pat. No. 11,068,453, which is a
(Continued)

(51) Int. Cl.
*G06F 16/2455* (2019.01)
*G06F 16/22* (2019.01)
(Continued)

(52) U.S. Cl.
CPC ........ *G06F 16/221* (2019.01); *G06F 16/2456* (2019.01); *G06F 16/24578* (2019.01);
(Continued)

(58) Field of Classification Search
CPC ........... G06F 16/24578; G06F 16/9024; G06F 16/221; G06F 16/285; G06F 16/256; G06F 16/2456; G06F 16/258; G06F 16/252
(Continued)

(56) References Cited

U.S. PATENT DOCUMENTS 5,371,499 A * 12/1994 Graybill .............. H03M 7/3084
341/51
5,845,285 A 12/1998 Klein
(Continued)

FOREIGN PATENT DOCUMENTS

AU 2012289936 A1 2/2014
CA 2820994 A1 1/2014
(Continued)

OTHER PUBLICATIONS

"Data.World Comes Out Of Stealth To Make Open Data Easier." Americaninno.com, AustinInno, Jul. 11, 2016, Retrieved from the Internet; URL: www.americaninno.com/austin/open-data-tech-brett-hurts-startup-data-world-launches/ [retrieved Jan. 27, 2020].
(Continued)

*Primary Examiner* — Amy Ng
*Assistant Examiner* — Antonio J Caiado
(74) *Attorney, Agent, or Firm* — KOKKA & BACKUS, PC

(57) ABSTRACT

Various techniques are described, including evaluating ingested data including a dataset to identify one or more links to other datasets stored in a graph, using a similarity determination algorithm to identify a degree of similarity between datasets to determine joinability of ingested datasets with graph-stored datasets, determining a ratio to determine whether to perform an overlap or coverage function, associating a subset of similarity matrices with a subset of graph data joined to the ingested dataset, and forming links in a column of data between the dataset and the another dataset of the ingested data based on the degree of similarity.

20 Claims, 8 Drawing Sheets

Related U.S. Application Data continuation-in-part of application No. 15/985,704, filed on May 22, 2018, now Pat. No. 11,068,847, and a continuation-in-part of application No. 15/985,702, filed on May 22, 2018, now Pat. No. 11,068,475, and a continuation-in-part of application No. 15/927,004, filed on Mar. 20, 2018, now Pat. No. 11,036,716, and a continuation-in-part of application No. 15/926,999, filed on Mar. 20, 2018, now Pat. No. 11,016,931, and a continuation-in-part of application No. 15/454,923, filed on Mar. 9, 2017, now Pat. No. 10,353,911.

(51) Int. Cl.
    *G06F 16/2457* (2019.01)
    *G06F 16/25* (2019.01)
    *G06F 16/28* (2019.01)
    *G06F 16/901* (2019.01)

(52) U.S. Cl.
    CPC .......... *G06F 16/252* (2019.01); *G06F 16/256* (2019.01); *G06F 16/258* (2019.01); *G06F 16/285* (2019.01); *G06F 16/9024* (2019.01)

(58) Field of Classification Search
    USPC .......................................................... 707/749
    See application file for complete search history.

(56) References Cited

U.S. PATENT DOCUMENTS

| | | | |
|---|---|---|---|
| 6,144,962 A | 11/2000 | Weinberg et al. |
| 6,317,752 B1 | 11/2001 | Lee et al. |
| 6,529,909 B1 | 3/2003 | Bowman-Amuah |
| 6,768,986 B2 | 7/2004 | Cras et al. |
| 6,961,728 B2 | 11/2005 | Wynblatt et al. |
| 7,080,090 B2 | 7/2006 | Shah et al. |
| 7,143,046 B2 | 11/2006 | Babu et al. |
| 7,146,375 B2 | 12/2006 | Egilsson et al. |
| 7,680,862 B2 | 3/2010 | Chong et al. |
| 7,702,639 B2 | 4/2010 | Stanley et al. |
| 7,761,407 B1 | 7/2010 | Stern |
| 7,818,352 B2 | 10/2010 | Krishnamoorthy et al. |
| 7,836,063 B2 | 11/2010 | Salazar et al. |
| 7,853,081 B2 | 12/2010 | Thint |
| 7,856,416 B2 | 12/2010 | Hoffman et al. |
| 7,877,350 B2 | 1/2011 | Stanfill et al. |
| 7,953,695 B2 | 5/2011 | Roller et al. |
| 7,974,966 B2 | 7/2011 | Robie |
| 7,987,179 B2 | 7/2011 | Ma et al. |
| 8,037,108 B1 | 10/2011 | Chang |
| 8,060,472 B2 | 11/2011 | Itai et al. |
| 8,099,382 B2 | 1/2012 | Liu et al. |
| 8,170,981 B1 | 5/2012 | Tewksbary |
| 8,275,784 B2 | 9/2012 | Cao et al. |
| 8,296,200 B2 | 10/2012 | Mangipudi et al. |
| 8,312,389 B2 | 11/2012 | Crawford et al. |
| 8,429,179 B1 | 4/2013 | Mirhaji |
| 8,521,565 B2 | 8/2013 | Faulkner et al. |
| 8,538,985 B2 | 9/2013 | Betawadkar-Norwood et al. |
| 8,583,631 B1 | 11/2013 | Ganapathi et al. |
| 8,616,443 B2 | 12/2013 | Butt et al. |
| 8,640,056 B2 | 1/2014 | Helfman et al. |
| 8,719,252 B2 | 5/2014 | Miranker et al. |
| 8,762,160 B2 | 6/2014 | Lulla |
| 8,799,240 B2 | 8/2014 | Stowe et al. |
| 8,831,070 B2 | 9/2014 | Huang et al. |
| 8,843,502 B2 | 9/2014 | Elson et al. |
| 8,849,783 B2 | 9/2014 | Abramovitz et al. |
| 8,849,784 B2 | 9/2014 | Alber et al. |
| 8,856,643 B2 | 10/2014 | Drieschner |
| 8,892,513 B2 | 11/2014 | Forsythe |
| 8,930,337 B2 | 1/2015 | Studer et al. |
| 8,935,272 B2 | 1/2015 | Ganti et al. |
| 8,943,313 B2 | 1/2015 | Glew et al. |
| 8,965,915 B2 | 2/2015 | Ganti et al. |
| 8,990,236 B2 | 3/2015 | Mizrahy et al. |
| 8,996,492 B2 | 3/2015 | Paradies et al. |
| 8,996,559 B2 | 3/2015 | Ganti et al. |
| 8,996,978 B2 | 3/2015 | Richstein et al. |
| 9,002,860 B1 | 4/2015 | Ghemawat |
| 9,020,921 B2 | 4/2015 | Alber et al. |
| 9,171,077 B2 | 10/2015 | Balmin et al. |
| 9,218,365 B2 | 12/2015 | Irani et al. |
| 9,244,952 B2 | 1/2016 | Ganti et al. |
| 9,268,820 B2 | 2/2016 | Henry |
| 9,268,950 B2 | 2/2016 | Gkoulalas-Divanis et al. |
| 9,335,885 B1 | 5/2016 | Brocato |
| 9,396,283 B2 | 7/2016 | Miranker et al. |
| 9,454,611 B2 | 9/2016 | Henry |
| 9,495,429 B2 | 11/2016 | Miranker |
| 9,560,026 B1 | 1/2017 | Worsley |
| 9,607,042 B2 | 3/2017 | Long |
| 9,613,152 B2 | 4/2017 | Kucera |
| 9,659,081 B1 | 5/2017 | Ghodsi et al. |
| 9,690,792 B2 | 6/2017 | Bartlett et al. |
| 9,696,981 B2 | 7/2017 | Martin et al. |
| 9,710,526 B2 | 7/2017 | Couris et al. |
| 9,710,568 B2 | 7/2017 | Srinivasan et al. |
| 9,720,958 B2 | 8/2017 | Bagehorn et al. |
| 9,760,602 B1 | 9/2017 | Ghodsi et al. |
| 9,769,032 B1 | 9/2017 | Ghodsi et al. |
| 9,798,737 B2 | 10/2017 | Palmer |
| 9,836,302 B1 | 12/2017 | Hunter et al. |
| 9,959,337 B2 | 5/2018 | Ghodsi et al. |
| 9,990,230 B1 | 6/2018 | Stoica et al. |
| 10,095,735 B2 | 10/2018 | Ghodsi et al. |
| 10,102,258 B2 | 10/2018 | Jacob et al. |
| 10,176,234 B2 | 1/2019 | Gould et al. |
| 10,216,860 B2 | 2/2019 | Miranker et al. |
| 10,248,297 B2 | 4/2019 | Beechuk et al. |
| 10,296,329 B2 | 5/2019 | Hunter et al. |
| 10,318,567 B2 | 6/2019 | Henry |
| 10,324,925 B2 | 6/2019 | Jacob et al. |
| 10,346,429 B2 | 7/2019 | Jacob et al. |
| 10,353,911 B2 | 7/2019 | Reynolds et al. |
| 10,361,928 B2 | 7/2019 | Ghodsi et al. |
| 10,438,013 B2 | 10/2019 | Jacob et al. |
| 10,452,677 B2 | 10/2019 | Jacob et al. |
| 10,452,975 B2 | 10/2019 | Jacob et al. |
| 10,474,501 B2 | 11/2019 | Ghodsi et al. |
| 10,474,736 B1 | 11/2019 | Stoica et al. |
| 10,545,986 B2 | 1/2020 | Tappan et al. |
| 10,546,001 B1 | 1/2020 | Nguyen et al. |
| D876,454 S | 2/2020 | Knowles et al. |
| 10,558,664 B2 | 2/2020 | Armbrust et al. |
| D877,167 S | 3/2020 | Knowles et al. |
| D879,112 S | 3/2020 | Hejazi et al. |
| 10,606,675 B1 | 3/2020 | Luszczak et al. |
| 10,645,548 B2 | 5/2020 | Reynolds et al. |
| 10,664,509 B1 | 5/2020 | Reeves et al. |
| 10,673,887 B2 | 6/2020 | Crabtree et al. |
| 10,678,536 B2 | 6/2020 | Hunter et al. |
| 10,691,299 B2 | 6/2020 | Broek et al. |
| 10,691,433 B2 | 6/2020 | Shankar et al. |
| 10,713,314 B2 | 7/2020 | Yan et al. |
| 10,769,130 B2 | 9/2020 | Armbrust et al. |
| 10,769,535 B2 | 9/2020 | Lindsley |
| 10,810,051 B1 | 10/2020 | Shankar et al. |
| 10,922,308 B2 | 2/2021 | Griffith |
| 10,984,008 B2 | 4/2021 | Jacob et al. |
| 11,042,556 B2 | 6/2021 | Griffith et al. |
| 11,042,560 B2 | 6/2021 | Griffith et al. |
| 11,068,453 B2 | 7/2021 | Griffith |
| 11,068,475 B2 | 7/2021 | Boutros et al. |
| 11,068,847 B2 | 7/2021 | Boutros et al. |
| 11,093,539 B2 | 8/2021 | Henry |
| 11,294,972 B2 | 4/2022 | George et al. |
| 11,327,991 B2 | 5/2022 | Reynolds et al. |
| 11,468,049 B2 | 10/2022 | Griffith et al. |
| 11,500,831 B2 | 11/2022 | Griffith et al. |
| 11,567,936 B1 | 1/2023 | Jindal et al. |
| 2002/0133476 A1 | 9/2002 | Reinhardt |
| 2002/0143755 A1 | 10/2002 | Wynblatt et al. |

(56) References Cited

U.S. PATENT DOCUMENTS

| | | |
|---|---|---|
| 2003/0093597 A1 | 5/2003 | Marshak et al. |
| 2003/0120681 A1 | 6/2003 | Baclawski |
| 2003/0208506 A1 | 11/2003 | Greenfield et al. |
| 2003/0229652 A1 | 12/2003 | Bakalash et al. |
| 2004/0064456 A1 | 4/2004 | Fong et al. |
| 2005/0004888 A1 | 1/2005 | McCrady et al. |
| 2005/0010550 A1 | 1/2005 | Potter et al. |
| 2005/0010566 A1 | 1/2005 | Cushing et al. |
| 2005/0234957 A1 | 10/2005 | Olson et al. |
| 2005/0246357 A1 | 11/2005 | Geary et al. |
| 2005/0278139 A1 | 12/2005 | Glaenzer et al. |
| 2006/0100995 A1 | 5/2006 | Albornoz et al. |
| 2006/0117057 A1 | 6/2006 | Legault et al. |
| 2006/0129605 A1 | 6/2006 | Doshi |
| 2006/0161545 A1 | 7/2006 | Pura |
| 2006/0168002 A1 | 7/2006 | Chesley |
| 2006/0218024 A1 | 9/2006 | Lulla |
| 2006/0235837 A1 | 10/2006 | Chong et al. |
| 2007/0027904 A1 | 2/2007 | Chow et al. |
| 2007/0055662 A1 | 3/2007 | Edelman et al. |
| 2007/0118399 A1 | 5/2007 | Avinash et al. |
| 2007/0139227 A1 | 6/2007 | Speirs et al. |
| 2007/0179760 A1 | 8/2007 | Smith |
| 2007/0203933 A1 | 8/2007 | Iversen et al. |
| 2007/0271604 A1 | 11/2007 | Webster et al. |
| 2007/0276875 A1 | 11/2007 | Brunswig et al. |
| 2008/0046427 A1 | 2/2008 | Lee et al. |
| 2008/0091634 A1 | 4/2008 | Seeman |
| 2008/0140609 A1 | 6/2008 | Werner et al. |
| 2008/0162409 A1 | 7/2008 | Meijer et al. |
| 2008/0162550 A1 | 7/2008 | Fey |
| 2008/0162999 A1 | 7/2008 | Schlueter et al. |
| 2008/0216060 A1 | 9/2008 | Vargas |
| 2008/0240566 A1 | 10/2008 | Thint |
| 2008/0256026 A1 | 10/2008 | Hays |
| 2008/0294996 A1 | 11/2008 | Hunt et al. |
| 2008/0307189 A1* | 12/2008 | Mityagin .............. G06F 16/93 |
| | | 711/E12.002 |
| 2008/0319829 A1 | 12/2008 | Hunt et al. |
| 2009/0006156 A1 | 1/2009 | Hunt et al. |
| 2009/0013281 A1 | 1/2009 | Helfman et al. |
| 2009/0018996 A1 | 1/2009 | Hunt et al. |
| 2009/0064053 A1 | 3/2009 | Crawford et al. |
| 2009/0094416 A1 | 4/2009 | Baeza-Yates et al. |
| 2009/0106734 A1 | 4/2009 | Riesen et al. |
| 2009/0119254 A1 | 5/2009 | Cross et al. |
| 2009/0132474 A1 | 5/2009 | Ma et al. |
| 2009/0132503 A1 | 5/2009 | Sun et al. |
| 2009/0138437 A1 | 5/2009 | Krishnamoorthy et al. |
| 2009/0150313 A1 | 6/2009 | Heilper et al. |
| 2009/0157630 A1 | 6/2009 | Yuan |
| 2009/0182710 A1 | 7/2009 | Short et al. |
| 2009/0198693 A1 | 8/2009 | Pura |
| 2009/0234799 A1 | 9/2009 | Betawadkar-Norwood et al. |
| 2009/0234869 A1 | 9/2009 | Azvine et al. |
| 2009/0248714 A1 | 10/2009 | Liu |
| 2009/0300054 A1 | 12/2009 | Fisher et al. |
| 2010/0011077 A1* | 1/2010 | Shkolnikov ........... H04L 51/063 |
| | | 709/206 |
| 2010/0114885 A1 | 5/2010 | Bowers et al. |
| 2010/0138388 A1 | 6/2010 | Wakeling et al. |
| 2010/0189318 A1 | 7/2010 | Chang et al. |
| 2010/0223266 A1 | 9/2010 | Balmin et al. |
| 2010/0235384 A1 | 9/2010 | Itai et al. |
| 2010/0241644 A1 | 9/2010 | Jackson et al. |
| 2010/0250576 A1 | 9/2010 | Bowers et al. |
| 2010/0250577 A1 | 9/2010 | Cao et al. |
| 2010/0268722 A1 | 10/2010 | Yalamanchi et al. |
| 2010/0332453 A1 | 12/2010 | Prahlad et al. |
| 2011/0035376 A1 | 2/2011 | Kirshenbaum |
| 2011/0040967 A1* | 2/2011 | Waller .................... G06F 21/10 |
| | | 713/160 |
| 2011/0153047 A1 | 6/2011 | Cameron et al. |
| 2011/0202560 A1 | 8/2011 | Bowers et al. |
| 2011/0283231 A1 | 11/2011 | Richstein et al. |
| 2011/0298804 A1 | 12/2011 | Hao et al. |
| 2012/0011144 A1 | 1/2012 | Transier et al. |
| 2012/0016895 A1 | 1/2012 | Butt et al. |
| 2012/0036162 A1 | 2/2012 | Gimbel |
| 2012/0102022 A1 | 4/2012 | Miranker et al. |
| 2012/0154633 A1 | 6/2012 | Rodriguez |
| 2012/0179644 A1 | 7/2012 | Miranker |
| 2012/0190386 A1 | 7/2012 | Anderson |
| 2012/0254192 A1 | 10/2012 | Gelbard |
| 2012/0278321 A1* | 11/2012 | Traub .................. G06F 16/3331 |
| | | 707/E17.014 |
| 2012/0278902 A1 | 11/2012 | Martin et al. |
| 2012/0284301 A1 | 11/2012 | Mizrahy et al. |
| 2012/0310674 A1 | 12/2012 | Faulkner et al. |
| 2012/0323887 A1 | 12/2012 | Marum et al. |
| 2012/0323889 A1 | 12/2012 | Marum et al. |
| 2012/0330908 A1 | 12/2012 | Stowe et al. |
| 2012/0330979 A1 | 12/2012 | Elson et al. |
| 2013/0031208 A1 | 1/2013 | Linton et al. |
| 2013/0031364 A1 | 1/2013 | Glew et al. |
| 2013/0041893 A1 | 2/2013 | Strike |
| 2013/0054517 A1 | 2/2013 | Beechuk et al. |
| 2013/0086022 A1 | 4/2013 | Black, III et al. |
| 2013/0110775 A1 | 5/2013 | Forsythe |
| 2013/0110825 A1 | 5/2013 | Henry |
| 2013/0114645 A1 | 5/2013 | Huang et al. |
| 2013/0138681 A1 | 5/2013 | Abrams et al. |
| 2013/0156348 A1 | 6/2013 | Irani et al. |
| 2013/0204905 A1* | 8/2013 | Loffe ........................ H04L 9/00 |
| | | 707/E17.044 |
| 2013/0238667 A1 | 9/2013 | Carvalho et al. |
| 2013/0262443 A1 | 10/2013 | Leida et al. |
| 2013/0263019 A1 | 10/2013 | Castellanos et al. |
| 2013/0318062 A1 | 11/2013 | Studer et al. |
| 2013/0318070 A1 | 11/2013 | Wu et al. |
| 2013/0321458 A1 | 12/2013 | Miserendino et al. |
| 2014/0006448 A1 | 1/2014 | McCall |
| 2014/0019426 A1 | 1/2014 | Palmer |
| 2014/0067762 A1 | 3/2014 | Carvalho |
| 2014/0113638 A1* | 4/2014 | Zhang .................. H04W 24/02 |
| | | 455/446 |
| 2014/0115013 A1 | 4/2014 | Anderson |
| 2014/0119611 A1 | 5/2014 | Prevrhal et al. |
| 2014/0143760 A1 | 5/2014 | Buxbaum et al. |
| 2014/0164431 A1 | 6/2014 | Tolbert |
| 2014/0172810 A1 | 6/2014 | Paradies et al. |
| 2014/0198097 A1 | 7/2014 | Evans |
| 2014/0214857 A1 | 7/2014 | Srinivasan et al. |
| 2014/0229869 A1 | 8/2014 | Chiantera et al. |
| 2014/0236914 A1 | 8/2014 | Okamura et al. |
| 2014/0236933 A1 | 8/2014 | Schoenbach et al. |
| 2014/0244623 A1 | 8/2014 | King |
| 2014/0279640 A1 | 9/2014 | Moreno et al. |
| 2014/0279845 A1 | 9/2014 | Ganti et al. |
| 2014/0280067 A1 | 9/2014 | Ganti et al. |
| 2014/0280192 A1 | 9/2014 | Cronin et al. |
| 2014/0280286 A1 | 9/2014 | Ganti et al. |
| 2014/0280287 A1 | 9/2014 | Ganti et al. |
| 2014/0297665 A1 | 10/2014 | Stevens et al. |
| 2014/0337331 A1 | 11/2014 | Hassanzadeh et al. |
| 2014/0337436 A1 | 11/2014 | Hoagland et al. |
| 2014/0344287 A1* | 11/2014 | Carvalho ............ G06F 16/2282 |
| | | 707/812 |
| 2014/0372434 A1 | 12/2014 | Smith et al. |
| 2015/0046547 A1 | 2/2015 | Vohra et al. |
| 2015/0052125 A1 | 2/2015 | Ellis et al. |
| 2015/0052134 A1 | 2/2015 | Bornea et al. |
| 2015/0066387 A1* | 3/2015 | Yamada .................. H01J 49/004 |
| | | 702/23 |
| 2015/0081666 A1 | 3/2015 | Long |
| 2015/0095391 A1 | 4/2015 | Gajjar et al. |
| 2015/0120643 A1 | 4/2015 | Dantressangle et al. |
| 2015/0142829 A1 | 5/2015 | Lee et al. |
| 2015/0143248 A1 | 5/2015 | Beechuk et al. |
| 2015/0149879 A1 | 5/2015 | Miller et al. |
| 2015/0186653 A1 | 7/2015 | Gkoulalas-Divanis et al. |
| 2015/0213109 A1 | 7/2015 | Kassko et al. |
| 2015/0234884 A1 | 8/2015 | Henriksen |
| 2015/0242867 A1 | 8/2015 | Prendergast et al. |

(56) References Cited

U.S. PATENT DOCUMENTS

| | | |
|---|---|---|
| 2015/0269223 A1 | 9/2015 | Miranker et al. |
| 2015/0277725 A1 | 10/2015 | Masterson et al. |
| 2015/0278273 A1 | 10/2015 | Wigington et al. |
| 2015/0278335 A1 | 10/2015 | Opitz et al. |
| 2015/0339572 A1 | 11/2015 | Achin et al. |
| 2015/0356144 A1 | 12/2015 | Chawla et al. |
| 2015/0372915 A1 | 12/2015 | Shen et al. |
| 2015/0379079 A1 | 12/2015 | Kota |
| 2016/0004820 A1 | 1/2016 | Moore |
| 2016/0012059 A1 | 1/2016 | Balmin et al. |
| 2016/0019091 A1 | 1/2016 | Leber et al. |
| 2016/0026677 A1* | 1/2016 | Feo .................. G06F 9/54 707/718 |
| 2016/0055184 A1 | 2/2016 | Fokoue-Nkoutche et al. |
| 2016/0055261 A1 | 2/2016 | Reinhardt et al. |
| 2016/0063017 A1 | 3/2016 | Bartlett et al. |
| 2016/0063271 A1 | 3/2016 | Bartlett et al. |
| 2016/0092090 A1 | 3/2016 | Stojanovic et al. |
| 2016/0092474 A1 | 3/2016 | Stojanovic et al. |
| 2016/0092475 A1 | 3/2016 | Stojanovic et al. |
| 2016/0092476 A1 | 3/2016 | Stojanovic et al. |
| 2016/0092527 A1 | 3/2016 | Kang et al. |
| 2016/0098418 A1 | 4/2016 | Dakshinamurthy et al. |
| 2016/0100009 A1 | 4/2016 | Zoldi et al. |
| 2016/0103908 A1 | 4/2016 | Fletcher et al. |
| 2016/0117358 A1 | 4/2016 | Schmid et al. |
| 2016/0117362 A1 | 4/2016 | Bagehorn et al. |
| 2016/0125057 A1* | 5/2016 | Gould .................. G06F 16/2452 707/756 |
| 2016/0132572 A1 | 5/2016 | Chang et al. |
| 2016/0132608 A1 | 5/2016 | Rathod |
| 2016/0132787 A1 | 5/2016 | Drevo et al. |
| 2016/0147837 A1 | 5/2016 | Nguyen et al. |
| 2016/0162785 A1 | 6/2016 | Grobman |
| 2016/0171380 A1 | 6/2016 | Kennel et al. |
| 2016/0173338 A1 | 6/2016 | Wolting |
| 2016/0188789 A1 | 6/2016 | Kisiel et al. |
| 2016/0203196 A1 | 7/2016 | Schnall-Levin et al. |
| 2016/0210364 A1 | 7/2016 | Henry |
| 2016/0225271 A1 | 8/2016 | Robichaud et al. |
| 2016/0232457 A1* | 8/2016 | Gray .................. G06F 16/26 |
| 2016/0246820 A1 | 8/2016 | Depaoli et al. |
| 2016/0275204 A1 | 9/2016 | Miranker et al. |
| 2016/0283551 A1 | 9/2016 | Fokoue-Nkoutche et al. |
| 2016/0292206 A1 | 10/2016 | Velazquez et al. |
| 2016/0314143 A1 | 10/2016 | Hiroshige |
| 2016/0321316 A1 | 11/2016 | Pennefather et al. |
| 2016/0322082 A1 | 11/2016 | Davis et al. |
| 2016/0350414 A1 | 12/2016 | Henry |
| 2016/0352592 A1* | 12/2016 | Sasaki .................. H04L 43/0894 |
| 2016/0358102 A1 | 12/2016 | Bowers et al. |
| 2016/0358103 A1 | 12/2016 | Bowers et al. |
| 2016/0371288 A1 | 12/2016 | Biannic et al. |
| 2016/0371355 A1 | 12/2016 | Massari et al. |
| 2017/0017537 A1 | 1/2017 | Razin et al. |
| 2017/0032259 A1 | 2/2017 | Goranson et al. |
| 2017/0053130 A1 | 2/2017 | Hughes et al. |
| 2017/0060931 A1* | 3/2017 | Puri .................. G06Q 10/063 |
| 2017/0075973 A1 | 3/2017 | Miranker |
| 2017/0085481 A1* | 3/2017 | Park .................. H04W 4/70 |
| 2017/0132401 A1 | 5/2017 | Gopi et al. |
| 2017/0161323 A1 | 6/2017 | Simitsis et al. |
| 2017/0161341 A1 | 6/2017 | Hrabovsky et al. |
| 2017/0177729 A1 | 6/2017 | Duke et al. |
| 2017/0213004 A1 | 7/2017 | Fox et al. |
| 2017/0214705 A1* | 7/2017 | Gupta .................. G06F 21/577 |
| 2017/0220615 A1 | 8/2017 | Bendig et al. |
| 2017/0220667 A1 | 8/2017 | Ghodsi et al. |
| 2017/0228405 A1 | 8/2017 | Ward et al. |
| 2017/0236060 A1 | 8/2017 | Ignatyev |
| 2017/0316070 A1 | 11/2017 | Krishnan et al. |
| 2017/0318020 A1 | 11/2017 | Kamath et al. |
| 2017/0357653 A1 | 12/2017 | Bicer et al. |
| 2017/0364538 A1 | 12/2017 | Jacob et al. |
| 2017/0364539 A1 | 12/2017 | Jacob et al. |
| 2017/0364553 A1 | 12/2017 | Jacob et al. |
| 2017/0364564 A1 | 12/2017 | Jacob et al. |
| 2017/0364568 A1 | 12/2017 | Reynolds et al. |
| 2017/0364569 A1* | 12/2017 | Jacob .................. G06F 16/2471 |
| 2017/0364570 A1 | 12/2017 | Jacob et al. |
| 2017/0364694 A1 | 12/2017 | Jacob et al. |
| 2017/0364703 A1 | 12/2017 | Jacob et al. |
| 2017/0371881 A1 | 12/2017 | Reynolds et al. |
| 2017/0371926 A1 | 12/2017 | Shiran et al. |
| 2018/0024966 A1 | 1/2018 | Eilert et al. |
| 2018/0025027 A1 | 1/2018 | Palmer |
| 2018/0025307 A1 | 1/2018 | Hui et al. |
| 2018/0031703 A1 | 2/2018 | Ngai et al. |
| 2018/0032327 A1 | 2/2018 | Adami et al. |
| 2018/0040077 A1 | 2/2018 | Smith et al. |
| 2018/0046668 A1 | 2/2018 | Ghodsi et al. |
| 2018/0048536 A1 | 2/2018 | Ghodsi et al. |
| 2018/0075115 A1* | 3/2018 | Murray .................. G06F 16/248 |
| 2018/0121194 A1 | 5/2018 | Hunter et al. |
| 2018/0210936 A1 | 7/2018 | Reynolds et al. |
| 2018/0218070 A1* | 8/2018 | Sharma .................. G06F 16/334 |
| 2018/0262864 A1 | 9/2018 | Reynolds et al. |
| 2018/0300354 A1 | 10/2018 | Liang et al. |
| 2018/0300494 A1 | 10/2018 | Avidan et al. |
| 2018/0314556 A1 | 11/2018 | Ghodsi et al. |
| 2018/0314705 A1 | 11/2018 | Griffith et al. |
| 2018/0314732 A1 | 11/2018 | Armbrust et al. |
| 2018/0330111 A1 | 11/2018 | Käbisch et al. |
| 2019/0005104 A1 | 1/2019 | Prabhu et al. |
| 2019/0034491 A1 | 1/2019 | Griffith et al. |
| 2019/0042606 A1 | 2/2019 | Griffith et al. |
| 2019/0050445 A1 | 2/2019 | Griffith et al. |
| 2019/0050459 A1 | 2/2019 | Griffith et al. |
| 2019/0057107 A1 | 2/2019 | Bartlett et al. |
| 2019/0065567 A1 | 2/2019 | Griffith et al. |
| 2019/0065569 A1 | 2/2019 | Boutros et al. |
| 2019/0066052 A1 | 2/2019 | Boutros et al. |
| 2019/0079968 A1 | 3/2019 | Griffith et al. |
| 2019/0095472 A1 | 3/2019 | Griffith |
| 2019/0121807 A1 | 4/2019 | Boutros et al. |
| 2019/0138538 A1* | 5/2019 | Stojanovic .................. G06F 16/254 |
| 2019/0155852 A1 | 5/2019 | Miranker et al. |
| 2019/0258479 A1 | 8/2019 | Hunter et al. |
| 2019/0266155 A1 | 8/2019 | Jacob et al. |
| 2019/0272279 A1 | 9/2019 | Jacob et al. |
| 2019/0278793 A1 | 9/2019 | Henry |
| 2019/0286617 A1 | 9/2019 | Abu-Abed et al. |
| 2019/0295029 A1 | 9/2019 | Gove, Jr. |
| 2019/0317961 A1 | 10/2019 | Brener et al. |
| 2019/0332606 A1 | 10/2019 | Kee et al. |
| 2019/0347244 A1 | 11/2019 | Jacob et al. |
| 2019/0347258 A1 | 11/2019 | Jacob et al. |
| 2019/0347259 A1 | 11/2019 | Jacob et al. |
| 2019/0347268 A1 | 11/2019 | Griffith |
| 2019/0347347 A1 | 11/2019 | Griffith |
| 2019/0370230 A1 | 12/2019 | Jacob et al. |
| 2019/0370262 A1 | 12/2019 | Reynolds et al. |
| 2019/0370266 A1 | 12/2019 | Jacob et al. |
| 2019/0370481 A1 | 12/2019 | Jacob et al. |
| 2019/0384571 A1* | 12/2019 | Oberbreckling .................. G06F 16/25 |
| 2020/0005356 A1 | 1/2020 | Greenberger et al. |
| 2020/0073644 A1 | 3/2020 | Shankar et al. |
| 2020/0073865 A1 | 3/2020 | Jacob et al. |
| 2020/0074298 A1 | 3/2020 | Jacob et al. |
| 2020/0097504 A1 | 3/2020 | Sequeda et al. |
| 2020/0097812 A1 | 3/2020 | Csar et al. |
| 2020/0117665 A1 | 4/2020 | Jacob et al. |
| 2020/0117688 A1 | 4/2020 | Sequeda et al. |
| 2020/0133964 A1 | 4/2020 | Lee et al. |
| 2020/0175012 A1 | 6/2020 | Jacob et al. |
| 2020/0175013 A1 | 6/2020 | Jacob et al. |
| 2020/0201854 A1 | 6/2020 | Miller |
| 2020/0218723 A1 | 7/2020 | Jacob et al. |
| 2020/0241950 A1 | 7/2020 | Luszczak et al. |
| 2020/0252766 A1 | 8/2020 | Reynolds et al. |
| 2020/0252767 A1 | 8/2020 | Reynolds et al. |
| 2020/0257689 A1 | 8/2020 | Armbrust et al. |
| 2020/0287775 A1 | 9/2020 | Khasis |
| 2020/0301684 A1 | 9/2020 | Shankar et al. |

(56) References Cited

U.S. PATENT DOCUMENTS

| | | |
|---|---|---|
| 2020/0380009 A1 | 12/2020 | Reynolds et al. |
| 2020/0409768 A1 | 12/2020 | Shankar et al. |
| 2021/0011901 A1 | 1/2021 | Armbrust et al. |
| 2021/0019327 A1 | 1/2021 | Reynolds et al. |
| 2021/0042299 A1 | 2/2021 | Migliori |
| 2021/0081414 A1 | 3/2021 | Jacob et al. |
| 2021/0109629 A1 | 4/2021 | Reynolds et al. |
| 2021/0117445 A1 | 4/2021 | Guo et al. |
| 2021/0173848 A1 | 6/2021 | Jacob et al. |
| 2021/0224250 A1 | 7/2021 | Griffith |
| 2021/0224330 A1 | 7/2021 | Miranker et al. |
| 2021/0294465 A1 | 9/2021 | Reynolds et al. |
| 2021/0374134 A1 | 12/2021 | He et al. |
| 2021/0374171 A1 | 12/2021 | Henry |
| 2021/0374555 A1 | 12/2021 | Beguerisse-Díaz et al. |
| 2021/0390098 A1 | 12/2021 | Reynolds et al. |
| 2021/0390141 A1 | 12/2021 | Jacob et al. |
| 2021/0390507 A1 | 12/2021 | Reynolds et al. |
| 2021/0397589 A1 | 12/2021 | Griffith et al. |
| 2021/0397611 A1 | 12/2021 | Boutres et al. |
| 2021/0397626 A1 | 12/2021 | Griffith et al. |
| 2022/0229838 A1 | 7/2022 | Jacob et al. |
| 2022/0229847 A1 | 7/2022 | Jacob et al. |
| 2022/0261411 A1 | 8/2022 | Reynolds et al. |
| 2022/0277004 A1 | 9/2022 | Griffith et al. |
| 2022/0327119 A1 | 10/2022 | Gasper et al. |
| 2022/0337978 A1 | 10/2022 | Reynolds et al. |
| 2023/0105459 A1 | 4/2023 | Griffith et al. |
| 2023/0109821 A1 | 4/2023 | Griffith et al. |
| 2023/0127572 A1 | 4/2023 | Jacob et al. |
| 2023/0153312 A1 | 5/2023 | Jacob et al. |
| 2023/0169123 A1 | 6/2023 | Griffith et al. |
| 2023/0169124 A1 | 6/2023 | Brener et al. |
| 2023/0252297 A1 | 8/2023 | Chu et al. |

FOREIGN PATENT DOCUMENTS

| | | |
|---|---|---|
| CN | 103425734 B | 6/2017 |
| EP | 2631817 A1 | 8/2013 |
| EP | 2631819 A1 | 8/2013 |
| EP | 2685394 A3 | 6/2017 |
| EP | 2740053 B1 | 6/2019 |
| GB | 2519779 A | 5/2015 |
| JP | 2013175181 A | 9/2013 |
| JP | 2013246828 A | 12/2013 |
| JP | 2014524124 A | 9/2014 |
| WO | 2012054860 A1 | 4/2012 |
| WO | 2013020084 A1 | 2/2013 |
| WO | 2017190153 A1 | 11/2017 |
| WO | 2017222927 A1 | 12/2017 |
| WO | 2018156551 A1 | 8/2018 |
| WO | 2018164971 A1 | 9/2018 |
| WO | 2021252805 A1 | 12/2021 |
| WO | 2023034328 A2 | 3/2023 |

OTHER PUBLICATIONS

Alaoui et al., "SQL to SPARQL Mapping for RDF querying based on a new Efficient Schema Conversion Technique," International Journal of Engineering Research & Technology (IJERT); ISSN: 2278-0181; vol. 4 Issue 10, Oct. 1, 2015, Retrieved from internet: https://www.ijert.org/research/sql-to-sparql-mapping-for-rdf-querying-based-on-a-new-efficient-schema-conversion-technique-IJERTV4IS1--1-5.pdf. Retrieved on Oct. 6, 2020.

Angles, R., Gutierrez. C., "The Expressive Power of SPARQL," Proceedings of the 7th International Semantic Web Conference (ISWC2008). 2008.

Arenas, M., et al., "A Direct Mapping of Relational Data to RDF," W3C Recommendation, Sep. 27, 2012, Retrieved from the Internet; URL: https://www.w3.org/TR/rdb-direct-mapping/ [retrieved Mar. 7, 2019].

Beckett, D., Berners-Lee, T., "Turtle—Terse RDF Triple Language," W3C Team Submission, Jan. 14, 2008, Retrieved from the Internet URL: https://www.w3.org/TeamSubmission/2008/SUBM-turtle-20080114/ [retrieved Mar. 7, 2019].

Beckett, D., Broekstra, J., "SPARQL Query Results XML Format," W3C Recommendation, Jan. 15, 2008, Retrieved from the Internet URL: https://www.w3.org/TR/2008/REC-rdf-sparql/XMLres-20080115/ [retrieved Mar. 7, 2019].

Beckett, Dave, "RDF/XML Syntax Specification (Revised)," W3C Recommendation, Feb. 10, 2004, Retrieved from the Internet; URL: https://www.w3.org/TR/2004/REC-rdf-syntax-grammar-20040210/ [retrieved Mar. 7, 2019].

Berners-Lee, Tim, "Notation 3," 2006, Retrieved from the Internet; URL: https://www.w3.org/DesignIssues/Notation3.html [retrieved on Mar. 7, 2019].

Berners-Lee, Tim, "Linked Data," 2009, Retrieved from the Internet; URL: https://www.w3.org/DesignIssues/LinkedData.html [retrieved on Mar. 7, 2019].

Boutros et al., "Computerized Tools To Develop and Manage Data-Driven Projects Collaboratively Via a Networked Computing Platform and Collaborative Datasets," U.S. Appl. No. 15/985,702, filed May 22, 2018.

Boutros et al., "Computerized Tools To Facilitate Data Project Development Via Data Access Layering Logic in a Networked Computing Platform Including Collaborative Datasets," U.S. Appl. No. 15/985,704, filed May 22, 2018.

Boutros et al., "Dynamic Composite Data Dictionary To Facilitate Data Operations Via Computerized Tools Configured To Access Collaborative Datasets in a Networked Computing Platform," U.S. Appl. No. 15/985,705, filed May 22, 2018.

Boutros et al., "Graphical User Interface for a Display Screen or Portion Thereof," U.S. Appl. No. 29/648,465, filed May 22, 2018.

Boutros et al., "Graphical User Interface for a Display Screen or Portion Thereof," U.S. Appl. No. 29/648,466, filed May 22, 2018.

Boutros et al., "Graphical User Interface for a Display Screen or Portion Thereof," U.S. Appl. No. 29/648,467, filed May 22, 2018.

Brener et al., "Computerized Tools Configured To Determine Subsets of Graph Data Arrangements for Linking Relevant Data To Enrich Datasets Associated With a Data-Driven Collaborative Dataset Platform," U.S. Appl. No. 16/395,036, filed Apr. 25, 2019.

Brickley, D., Guha, R.V., "Rdf Vocabulary Description Language 1.0: RDF Schema," W3C Recommendation, Feb. 10, 2004, Retrieved from the Internet; URL: https://www.w3.org/TR/2004/REC-rdf-schema-2004/0210/ [retrieved Mar. 7, 2019].

Buche et al., "Flexible SPARQL Querying of Web Data Tables Driven by an Ontology," FQAS 2009, LNAI 5822, Springer, 2009, pp. 345-357.

Bullock, Joshua, Final Office Action mailed Jan. 22, 2019 for U.S. Appl. No. 15/439,908.

Bullock, Joshua, Final Office Action mailed Jan. 22, 2019 for U.S. Appl. No. 15/439,911.

Bullock, Joshua, Final Office Action mailed Oct. 30, 2018 for U.S. Appl. No. 15/186,517.

Bullock, Joshua, Non-Final Office Action mailed Dec. 20, 2021 for U.S. Appl. No. 16/457,759.

Bullock, Joshua, Non-Final Office Action mailed Dec. 7, 2021 for U.S. Appl. No. 16/457,750.

Bullock, Joshua, Non-Final Office Action mailed Jul. 12, 2018 for U.S. Appl. No. 15/186,517.

Bullock, Joshua, Non-Final Office Action mailed Jun. 28, 2018 for U.S. Appl. No. 15/439,908.

Bullock, Joshua, Non-Final Office Action mailed Jun. 28, 2018 for U.S. Appl. No. 15/439,911.

Bullock, Joshua, Non-Final Office Action mailed Jun. 8, 2023 for U.S. Appl. No. 17/854,686.

Bullock, Joshua, Notice of Allowance and Fee(s) Due mailed Dec. 22, 2021 for U.S. Appl. No. 16/395,049.

Bullock, Joshua, Notice of Allowance and Fee(s) Due mailed Feb. 23, 2022 for U.S. Appl. No. 16/457,750.

Bullock, Joshua, Notice of Allowance and Fee(s) Due mailed Mar. 20, 2023 for U.S. Appl. No. 17/728,825.

Bullock, Joshua, Notice of Allowance and Fee(s) Due mailed Mar. 29, 2023 for U.S. Appl. No. 17/745,867.

Clark, K., Feigenbaum, L., Torres, E., "SPARQL Protocol for RDF," W3C Recommendation, Jan. 15, 2008, Retrieved from the Internet;

(56) References Cited

OTHER PUBLICATIONS

URL: https://www.w3.org/TR/2008/REC-rdf-sparql-protocol-20080115/ [retrieved Mar. 7, 2019].
Conyers, Dawaune A., Non-Final Office Action mailed Aug. 17, 2023 for U.S. Appl. No. 17/740,077.
Copenheaver, Blaine R., Notification of Transmittal of the International Search Report and the Written Opinion of the International Searching Authority, or the Declaration mailed Jul. 5, 2017 for International Patent Application No. PCT/US2017/030474.
Czajkowski, K., et al., "Grid Information Services for Distributed Resource Sharing," 10th IEEE International Symposium on High Performance Distributed Computing, pp. 181-184. IEEE Press, New York (2001).
Dean, M., Schreiber, G., "Owl Web Ontology Language Reference," W3C Recommendation, Feb. 10, 2004, Retrieved from the Internet; URL: https://www.w3.org/TR/2004/REC-owl-ref-20040210/ [retrieved Mar. 7, 2019].
Doung, Hien, Non-Final Office Action mailed Dec. 9, 2020 for U.S. Appl. No. 16/899,544.
Duong, Hien Luongvan, Non-Final Office Action mailed May 5, 2022 for U.S. Appl. No. 17/185,917.
Duong, Hien, Notice of Allowance and Fee(s) Due mailed Oct. 27, 2022 for U.S. Appl. No. 17/185,917.
Dwivedi, Mahesh H., Non-Final Office Action mailed Jan. 30, 2020 for U.S. Appl. No. 15/454,955.
Ellis, Matthew J., Non-Final Office Action mailed Sep. 25, 2020 for U.S. Appl. No. 16/139,374.
European Patent Office, Extended European Search Report for European Patent Application No. 18757122.9 mailed Oct. 15, 2020.
European Patent Office, Extended European Search Report for European Patent Application No. 18763855.6 mailed Sep. 28, 2020.
Feigenbaum, L., et al., "Semantic Web in Action," Scientific American, pp. 90-97, Dec. 2007.
Fernandez, J., et al., "Lightweighting the Web of Data through Compact RDF/HDT," Lozano J.A., Moreno J.A. (eds) Advances in Artificial Intelligence. CAEPIA 2011. Lecture Notes in Computer Science, vol. 7023. Springer, Berlin, Hidelberg.
Foster, I., Kesselman, C., "The Grid: Blueprint for a New Computing Infrastructure," Morgan Kaufmann, San Francisco (1999).
Foster, I., Kesselman, C., Nick, J., Tuecke, S., "The Physiology of the Grid: An Open Grid Services Architecture for Distributed Systems Integration," Technical Report, Global Grid Forum (2002).
Ganti et al., U.S. Appl. No. 14/058,184, filed Oct. 18, 2013 and entitled, "Assisted Query Formation, Validation, and Result Previewing in a Database Having a Complex Schema."
Ganti et al., U.S. Appl. No. 14/058,189, filed Oct. 18, 2013 and entitled, "Assisted Query Formation, Validation, and Result Previewing in a Database Having a Complex Schema."
Ganti et al., U.S. Appl. No. 14/058,208, filed Oct. 18, 2013 and entitled, "Editable and Searchable Markup Pages Automatically Populated Through User Query Monitoring."
Ganti et al., U.S. Appl. No. 61/802,716, filed Mar. 17, 2013 and entitled, "Data Profile Driven Query Builder."
Ganti et al., U.S. Appl. No. 61/802,742, filed Mar. 18, 2013 and entitled, "Developing a Social Data Catalog By Crowd-Sourcing."
Ganti et al., U.S. Appl. No. 61/802,743, filed Mar. 18, 2013 and entitled, "Creating a Data Catalog By Mining Queries."
Ganti et al., U.S. Appl. No. 61/802,744, filed Mar. 18, 2013 and entitled, "Auto-Completion of Queries With Data Object Names and Data Profiles."
Garay, Peter, Examination Report No. 1 for Standard Patent Application for Australia Patent Application No. 2017282656 mailed Jul. 21, 2021, Intellectual Property Office of Australia.
Garcia-Molina, H., Ullman, J., Widom, J., Database Systems: The Complete Book. Editorial Pearson Prentice Hall. Second Edition. Published Jan. 11, 2011. (Year: 2011).
Gawinecki, Maciej, "How schema mapping can help in data integration?—integrating the relational databases with ontologies," ITC School, Computer Science, XXIII Cycle DII, University of Modena and Reggio Emilia, Italy, 2008.
Gillin, Paul, "Neo4j Connector Integrates Graph Data With Business Intelligence Tools," SiliconANGLE, Published Mar. 24, 2020, Retrieved from https://siliconangle.com/2020/03/24/neo4j-connector-integrates-graph-data-business-intelligence-tools/ on Mar. 25, 2020.
Girma, Anteneh B., Final Office Action for U.S. Appl. No. 13/278,907, mailed Apr. 18, 2013.
Girma, Anteneh B., Non-Final Office Action for U.S. Appl. No. 13/278,907, mailed Jul. 25, 2012.
Grant, J., Beckett, D., "RDF Test Cases," W3C Recommendation, Feb. 10, 2004, Retrieved from the Internet; URL: https://www.w3.org/TR/2004/REC-rdf-testcases-20040210/ [retrieved Mar. 7, 2019].
Griffith et al., "Aggregation of Ancillary Data Associated With Source Data in a System of Networked Collaborative Datasets," U.S. Appl. No. 15/927,006, filed Mar. 20, 2018.
Griffith et al., "Data Ingestion To Generate Layered Dataset Interrelations To Form a System of Networked Collaborative Datasets," U.S. Appl. No. 15/926,999, filed Mar. 20, 2018.
Griffith et al., "Extended Computerized Query Language Syntax for Analyzing Multiple Tabular Data Arrangements in Data-Driven Collaborative Projects," U.S. Appl. No. 16/036,834, filed Jul. 16, 2018.
Griffith et al., "Layered Data Generation and Data Remediation To Facilitate Formation of Interrelated Data in a System of Networked Collaborative Datasets," U.S. Appl. No. 15/927,004, filed Mar. 20, 2018.
Griffith et al., "Link-Formative Auxiliary Queries Applied At Data Ingestion To Facilitate Data Operations in a System of Networked Collaborative Datasets," U.S. Appl. No. 15/943,633, filed Apr. 2, 2018.
Griffith et al., "Localized Link Formation To Perform Implicitly Federated Queries Using Extended Computerized Query Language Syntax," U.S. Appl. No. 16/036,836, filed Jul. 16, 2018.
Griffith et al., "Transmuting Data Associations Among Data Arrangements To Facilitate Data Operations in a System of Networked Collaborative Datasets," U.S. Appl. No. 15/943,629, filed Apr. 2, 2018.
Griffith, David Lee, "Determining a Degree of Similarity of a Subset of Tabular Data Arrangements To Subsets of Graph Data Arrangements At Ingestion Into a Data-Driven Collaborative Dataset Platform," U.S. Appl. No. 16/137,297, filed Sep. 20, 2018.
Griffith, David Lee, "Matching Subsets of Tabular Data Arrangements To Subsets of Graphical Data Arrangements At Ingestion Into Data Driven Collaborative Datasets," U.S. Appl. No. 16/137,292, filed Sep. 20, 2018.
Griffith, David Lee, "Predictive Determination of Constraint Data for Application With Linked Data in Graph-Based Datasets Associated With a Data-Driven Collaborative Dataset Platform," U.S. Appl. No. 16/139,374, filed Sep. 24, 2018.
Haveliwala et al., "Evaluating Strategies for Similarity Search on the Web," Proceedings of the 11th international conference on World Wide Web, May 7-11, 2002, Honolulu, Hawaii, USA (ACM), p. 432-442.
Hayes, Patrick, "RDF Semantics," W3C Recommendation, Feb. 10, 2004, Retrieved from the Internet; URL: https://www.w3.org/TR/2004/REC-rdf-mt-20040210/ [retrieved Mar. 7, 2019].
Heflin, J., "OWL Web Ontology Language Use Cases and Requirements," W3C Recommendation, Feb. 10, 2004, Retrieved from the Internet; URL: https://www.w3.org/TR/2004/REC-webnot-req-20040210 [retrieved Mar. 7, 2019].
Henry, Jerome William, U.S. Appl. No. 61/515,305, filed Aug. 4, 2011 entitled, "Apparatus and Method for Supplying Search Results With a Knowledge Card."
Hoang, Hau Hai, Final Office Action mailed Jul. 30, 2019 for U.S. Appl. No. 15/186,515.
Hoang, Hau Hai, Final Office Action mailed Nov. 26, 2018 for U.S. Appl. No. 15/186,515.
Hoang, Hau Hai, Non-Final Office Action mailed Apr. 12, 2023 for U.S. Appl. No. 17/562,984.
Hoang, Hau Hai, Non-Final Office Action mailed Apr. 16, 2019 for U.S. Appl. No. 15/186,515.
Hoang, Hau Hai, Non-Final Office Action mailed May 3, 2018 for U.S. Appl. No. 15/186,515.

(56) References Cited

OTHER PUBLICATIONS

Hoang, Hau Hai, Notice of Allowance and Fee(s) Due mailed Aug. 19, 2021 for U.S. Appl. No. 16/697,132.
Htay, Lin Lin M., Non-Final Office Action mailed Sep. 14, 2018 for U.S. Appl. No. 15/186,516.
Htay, Lin Lin M., Notice of Allowance and Fee(s) Due and Notice of Allowability for U.S. Appl. No. 15/186,516, mailed Jan. 25, 2019.
Hu, Xiaoqin, Final Office Action mailed Apr. 5, 2019 for U.S. Appl. No. 15/454,969.
Hu, Xiaoqin, Final Office Action mailed Apr. 5, 2019 for U.S. Appl. No. 15/454,981.
Hu, Xiaoqin, Final Office Action mailed Oct. 31, 2019 for U.S. Appl. No. 15/454,969.
Hu, Xiaoqin, Final Office Action mailed Sep. 24, 2019 for U.S. Appl. No. 15/454,981.
Hu, Xiaoqin, Non-Final Office Action for U.S. Appl. No. 15/454,969 mailed Dec. 7, 2018.
Hu, Xiaoqin, Non-Final Office Action for U.S. Appl. No. 15/454,981 mailed Dec. 12, 2018.
Hu, Xiaoqin, Non-Final Office Action mailed Aug. 1, 2019 for U.S. Appl. No. 15/454,981.
Hu, Xiaoqin, Non-Final Office Action mailed Jul. 26, 2019 for U.S. Appl. No. 15/454,969.
Jacob et al., "Management of Collaborative Datasets Via Distributed Computer Networks," U.S. Appl. No. 16/271,687, filed Feb. 8, 2019.
Jacob et al., "Management of Collaborative Datasets Via Distributed Computer Networks," U.S. Appl. No. 16/292,135, filed Mar. 4, 2019.
Jacob et al., "Platform Management of Integrated Access of Public and Privately-Accessible Datasets Utilizing Federated Query Generation and Schema Rewriting Optimization," International Patent Application No. PCT/US2018/018906 filed Feb. 21, 2018.
Jacob et al., "Query Generation for Collaborative Datasets," U.S. Appl. No. 16/395,043, filed Apr. 25, 2019.
Jacob et al., "Query Generation for Collaborative Datasets," U.S. Appl. No. 16/395,049, filed Apr. 25, 2019.
Jacob, Ajith, Non-Final Office Action mailed Jun. 23, 2023 for U.S. Appl. No. 17/539,158.
Joshi, Amit Krishna et al., "Alignment-based Querying of Linked Open Data," Lecture Notes in Computer Science, 7566, 807-824, 2012.
Kahn, Yasar et al., "SAFE: Policy Aware SPARQL Query Federation Over RDF Data Cubes," Proceedings of the 7th International Workshop on Semantic Web Applications and Tools for Life Sciences, Berlin, Germany, Dec. 9-11, 2014.
Khader, Tariq, Canadian Intellectual Property Office, Examiner Report for Canada Patent Application No. 3,028,636 (Jul. 26, 2023).
Khong, Alexander, Non-Final Office Action for U.S. Appl. No. 15/165,775, mailed Jun. 14, 2018.
Kim, Harry C., Notification of Transmittal of the International Search Report and the Written Opinion of the International Searching Authority, or the Declaration, mailed Sep. 28, 2021 for International Application No. PCT/ US2021/036880.
Klyne, G., Carroll, J., "Resource Description Framework (RDF): Concepts and Abstract Syntax," W3C Recommendation, Feb. 10, 2004, Retrieved from the Internet; URL: https://www.w3.org/TR/2004/REC-rdf-concepts-20040210 [retrieved Mar. 7, 2019].
Konda et al., Magellan: Toward Building Entity Matching Management Systems over Data Science Stacks, Proceedings of the VLDB Endowment, vol. 9, No. 13, (2016), pp. 1581-1584; URL: http://cpcp.wisc.edu/images/resources/magellan-vldb16.pdf, Date retrieved: Aug. 30, 2021.
Konda, Pradap, Magellan: Toward Building Entity Matching Management Systems, Presentation dated Feb. 27, 2018.
Krishnan et al., U.S. Appl. No. 15/583,966, filed May 1, 2017 and titled "Automatic Generation of Structured Data from Semi-Structured Data."
Langedgger, Andreas, "XL Wrap—Spreadsheet-to-RDF Wrapper," 2009, Retrieved from the Internet URL: http://xlwrap.sourceforge.net [retrieved Mar. 7, 2019].
Lee, Mark B., Non-Final Office Action for U.S. Appl. No. 13/180,444 mailed Jul. 2, 2012.
Lenz, H.J., Shoshani, A., "Summarizability in OLAP and Statistical Data Bases," Proceedings of the Ninth International Conference on Scientific and Statistical Database Management, 1997.
Manola, F., Miller, E., "RDF Primer," W3C Recommendation, Feb. 10, 2004, Retrieved from the Internet; URL: https://www.w3.org/TR/2004/REC-rdf-primer-20040210/ [retrieved Mar. 7, 2019].
Martin et al., U.S. Appl. No. 13/457,925, filed Apr. 27, 2012 and titled "Incremental Deployment of Computer Software Program Logic."
Martin et al., U.S. Appl. No. 61/479,621, filed Apr. 27, 2011 and titled "Incremental Deployment of Computer Software Program Logic."
May, P., Ehrlich, H.C., Steinke, T., "Zib Structure Prediction Pipeline: Composing a Complex Biological Workflow through Web Services," In: Nagel, W.E., Walter, W.V., Lehner, W. (eds.) Euro-Par 2006. LNCS, vol. 4128, pp. 1148-1158. Springer, Heidelberg (2006).
McGuiness, D., Van Harmelen, F., "OWL Web Ontology Language Overview," W3C Recommendation, Feb. 10, 2004, Retrieved from the Internet; URL: https://www.w3.org/TR/2004/REC-owl-features-20040210/ [retrieved Mar. 7, 2019].
Mian, Muhammad U., Non-Final Office Action mailed Jul. 21, 2023 for U.S. Appl. No. 17/902,749.
Mian, Muhammad U., Notice of Allowance and Fee(s) Due mailed Jun. 6, 2022 for U.S. Appl. No. 17/246,359.
Mian, Umar, Non-Final Office Action mailed Apr. 8, 2022 for U.S. Appl. No. 17/246,359.
Miranker, Daniel Paul, "Accessing Relational Databases as Resource Description Framework Databases," U.S. Appl. No. 61/406,021, filed Oct. 22, 2010.
Miranker, Daniel Paul, "Automatic Synthesis and Presentation of OLAP Cubes from Semantically Enriched Data Sources," U.S. Appl. No. 61/362,781, filed Jul. 9, 2010.
National Center for Biotechnology Information, Website, Retrieved from the Internet; URL: https://www.ncbi.nlm.nih.gov/ [retrieved Mar. 7, 2019].
Nguyen, Bao-Yen Thi, Restriction Requirement mailed Jun. 29, 2021 for Design U.S. Appl. No. 29/648,466.
Nguyen, Kim T., Non-Final Office Action mailed Apr. 25, 2022 for U.S. Appl. No. 17/163,287.
Nguyen, Kim T., Non-Final Office Action mailed Aug. 2, 2023 for U.S. Appl. No. 17/707,896.
Nguyen, Kim T., Non-Final Office Action mailed Aug. 31, 2021 for U.S. Appl. No. 16/899,549.
Nguyen, Kim T., Non-Final Office Action mailed Aug. 31, 2022 for U.S. Appl. No. 17/332,354.
Nguyen, Kim T., Non-Final Office Action mailed Aug. 31, 2022 for U.S. Appl. No. 17/333,914.
Nguyen, Kim T., Non-Final Office Action mailed Dec. 10, 2020 for U.S. Appl. No. 16/137,297.
Nguyen, Kim T., Non-Final Office Action mailed Dec. 8, 2020 for U.S. Appl. No. 15/985,704.
Nguyen, Kim T., Non-Final Office Action mailed Feb. 28, 2023 for U.S. Appl. No. 17/461,982.
Nguyen, Kim T., Non-Final Office Action mailed Jun. 14, 2018 for U.S. Appl. No. 15/186,514.
Nguyen, Kim T., Non-Final Office Action mailed Jun. 7, 2021 for U.S. Appl. No. 16/457,766.
Nguyen, Kim T., Non-Final Office Action mailed Mar. 20, 2019 for U.S. Appl. No. 15/454,923.
Nguyen, Kim T., Non-Final Office Action mailed May 11, 2021 for U.S. Appl. No. 16/395,036.
Nguyen, Kim T., Non-Final Office Action mailed Nov. 24, 2020 for U.S. Appl. No. 16/036,834.
Nguyen, Kim T., Non-Final Office Action mailed Nov. 24, 2020 for U.S. Appl. No. 16/036,836.
Nguyen, Kim T., Non-Final Office Action mailed Sep. 21, 2020 for U.S. Appl. No. 15/926,999.

(56) References Cited

OTHER PUBLICATIONS

Nguyen, Kim T., Notice of Allowance and Fee(s) Due mailed Nov. 21, 2022 for U.S. Appl. No. 17/332,354.
Nguyen, Kim T., Notice of Allowance and Fee(s) Due mailed Apr. 14, 2022 for U.S. Appl. No. 17/037,005.
Nguyen, Kim T., Notice of Allowance and Fee(s) Due mailed Aug. 17, 2021 for U.S. Appl. No. 16/428,915.
Nguyen, Kim T., Notice of Allowance and Fee(s) Due mailed Aug. 3, 2021 for U.S. Appl. No. 16/457,766.
Nguyen, Kim T., Notice of Allowance and Fee(s) Due mailed Jul. 11, 2022 for U.S. Appl. No. 17/332,368.
Nguyen, Kim T., Notice of Allowance and Fee(s) Due mailed Jul. 11, 2023 for U.S. Appl. No. 17/893,100.
Nguyen, Kim T., Notice of Allowance and Fee(s) Due mailed Mar. 16, 2021 for U.S. Appl. No. 15/985,702.
Nguyen, Kim T., Notice of Allowance and Fee(s) Due mailed Mar. 16, 2021 for U.S. Appl. No. 16/137,297.
Nguyen, Kim T., Notice of Allowance and Fee(s) Due mailed Mar. 17, 2021 for U.S. Appl. No. 15/985,704.
Nguyen, Kim T., Notice of Allowance and Fee(s) Due mailed Mar. 31, 2021 for U.S. Appl. No. 15/985,705.
Nguyen, Kim T., Notice of Allowance and Fee(s) Due mailed Sep. 28, 2022 for U.S. Appl. No. 17/163,287.
Nguyen, Kim T., Notice of Allowance and Fee(s) Due, mailed May 15, 2019 for U.S. Appl. No. 15/454,923.
Nguyen, Phong H., Non-Final Office Action mailed Jun. 23, 2023 for U.S. Appl. No. 17/539,162.
Niinimaki et al., "An ETL Process for OLAP Using RDF/OWL Ontologies," Journal on Data Semantics XIII, LNCS 5530, Springer, pp. 97-119, Aug. 12, 2009.
Noy et al., "Tracking Changes During Ontology Evolution." International Semantic Web Conference. Springer, Berlin, Heidelberg, 2004 (Year: 2004).
Pandit et al., "Using Ontology Design Patterns To Define SHACL Shapes," CEUR Workshop Proceedings, Proceedings of the 9th Workshop on Ontology Design and Patterns (WOP 2018), Monterey, USA, Oct. 9, 2018.
Parashar et al., U.S. Appl. No. 62/329,982, filed Apr. 29, 2016 and titled "Automatic Parsing of Semi-Structured Data and Identification of Missing Delimiters."
Patel-Schneider, P., Hayes, P., Horrocks, I., "Owl Web Ontology Language Semantics and Abstract Syntax," W3C Recommendation, Feb. 10, 2004, Retrieved from the Internet; URL: https://www.w3.org/TR/2004/REC-owl-semantics-20040210 [retrieved Mar. 7, 2019].
Perez, J., Arenas, M., Gutierrez, C., "Semantics and Complexity of SPARQL," In Proceedings of the International Semantic Web Conference (ISWC2006). 2006.
Prud'hommeaux, E., Seaborne, A., "SPARQL Query Language for RDF," W3C Recommendation, Jan. 15, 2008, Retrieved from the Internet; URL: https://www.w3.org/TR/2008/REC-rdf-sparql-query-20080115/ [retrieved Mar. 7, 2019].
Raab, Christopher J., Non-Final Office Action mailed Jul. 24, 2020 for U.S. Appl. No. 16/271,687.
Raab, Christopher J., Non-Final Office Action mailed Jun. 28, 2018 for U.S. Appl. No. 15/186,520.
Raab, Christopher J., Non-Final Office Action mailed Oct. 16, 2020 for U.S. Appl. No. 16/287,967.
Raab, Christopher J., Notice of Allowance and Fee(s) Due and Notice of Allowability for U.S. Appl. No. 15/186,520, mailed Jan. 2, 2019.
Rachapalli et al., "Retro: A Framework for Semantics Preserving SQL-to-SPARQL Translation," The University of Texas at Dallas; Sep. 18, 2011, XP055737294, Retrieved from internet: http://iswc2011.semanticweb.org/fileadmin/iswc/Papers/Workshope/EvoDyn/evodyn_3.pdf. Retrieved on Oct. 6, 2020.
RDB2RDF Working Group Charter, Sep. 2009, Retrieved from the Internet; URL: https://www.w3.org/2009/08/rdb2rdf-charter [retrieved Mar. 7, 2019].
Reynolds et al., "Computerized Tool Implementation of Layered Data Files To Discover, Form, or Analyze Dataset Interrelations of Networked Collaborative Datasets," U.S. Appl. No. 15/454,981, filed Mar. 9, 2017.
Reynolds et al., "Computerized Tools To Discover, Form, and Analyze Dataset Interrelations Among a System of Networked Collaborative Datasets," International Patent Application No. PCT/US2018/020812 filed Mar. 3, 2018.
Reynolds et al., "Interactive Interfaces To Present Data Arrangement Overviews and Summarized Dataset Attributes for Collaborative Datasets," U.S. Appl. No. 15/454,969, filed Mar. 9, 2017.
Rodriquez, Kari, Notification of Transmittal of the International Search Report and the Written Opinion of the International Searching Authority, or the Declaration mailed Feb. 8, 2023 for International Application No. PCT/US2022/042077.
Sahoo, S., et al., "A Survey of Current Approaches for Mapping of Relational Databases to RDF," W3C RDB2RDF XG Report, Incubator Group, URL: http://www.w3.org/2005/Incubator/rdb2rdf/RDB2RDF_Survey_Report_01082009.pdf; Published Jan. 8, 2009.
Sequeda, J., Depena, R., Miranker. D., "Ultrawrap: Using SQL Views for RDB2RDF," Poster in the 8th International Semantic Web Conference (ISWC2009), Washington DC, US, 2009.
Sequeda, J., et al., "Direct Mapping SQL Databases to the Semantic Web," Technical Report 09-04. The University of Texas at Austin, Department of Computer Sciences. 2009.
Sequeda, J., et al., "Ultrawrap: SPARQL Execution on Relational Data," Technical Report. The University of Texas at Austin, Department of Computer Sciences. 2012.
Sequeda, J., Tirmizi, S., Miranker, D., "SQL Databases are a Moving Target," Position Paper for W3C Workshop on RDF Access to Relational Databases, Cambridge, MA, USA, 2007.
Skevakis, Giannis et al., Metadata management, interoperability and Linked Data publishing support for Natural History Museums, Int J Digit Libr (2014), published online: Apr. 11, 2014; Springer-Verlag Berlin Heidelberg.
Slawski, Bill, Google Knowledge Cards Improve Search Engine Experiences, SEO by the Sea, Published Mar. 18, 2015, URL: https://www.seobythesea.com/2015/03/googles-knowledge-cards/, Retrieved Sep. 15, 2021.
Smith, M., Welty, C., McGuiness, D., "OWL Web Ontology Language Guide," W3C Recommendation, Feb. 10, 2004, Retrieved from the Internet; URL: https://www.w3.org/TR/2004/REC-owl-guide-20040210/ [retrieved Mar. 7, 2019].
Smith, T.F., Waterman, M.S., "Identification of Common Molecular Subsequences," J. Mol. Biol. 147, 195-197 (1981).
Spieler, William, Advisory Action mailed Nov. 22, 2021 for U.S. Appl. No. 16/435,196.
Spieler, William, Final Office Action mailed Mar. 15, 2021 for U.S. Appl. No. 16/435,196.
Spieler, William, Non-Final Office Action mailed Dec. 31, 2020 for U.S. Appl. No. 16/435,196.
Spieler, William, Non-Final Office Action mailed Feb. 25, 2021 for U.S. Appl. No. 16/558,076.
Ultrawrap Mapper, U.S. Appl. No. 62/169,268, filed Jun. 1, 2015 (Expired).
Vu, Bai Duc, Notice of Allowance and Fee(s) Due mailed Aug. 22, 2022 for U.S. Appl. No. 16/899,551.
Vy, Hung T., Final Office Action for U.S. Appl. No. 13/180,444 mailed Dec. 3, 2014.
Vy, Hung T., Final Office Action for U.S. Appl. No. 13/180,444 mailed Dec. 9, 2015.
Vy, Hung T., Final Office Action for U.S. Appl. No. 13/180,444 mailed Feb. 22, 2013.
Vy, Hung T., Non-Final Office Action for U.S. Appl. No. 13/180,444 mailed Jun. 18, 2015.
Vy, Hung T., Non-Final Office Action for U.S. Appl. No. 13/180,444 mailed Mar. 26, 2014.
Vy, Hung T., Non-Final Office Action for U.S. Appl. No. 15/273,930 mailed Dec. 20, 2017.
Willis, Amanda Lynn, Final Office Action mailed Apr. 18, 2022 for U.S. Appl. No. 16/899,547.
Willis, Amanda Lynn, Final Office Action mailed Mar. 22, 2023 for U.S. Appl. No. 16/899,547.

(56) References Cited

OTHER PUBLICATIONS

Willis, Amanda Lynn, Non-Final Office Action mailed Feb. 8, 2022 for U.S. Appl. No. 16/899,547.
Willis, Amanda Lynn, Non-Final Office Action mailed Sep. 8, 2022 for U.S. Appl. No. 16/899,547.
Woo, Isaac M., Non-Final Office Action mailed Jul. 28, 2022 for U.S. Appl. No. 17/004,570.
Woo, Isaac M., Non-Final Office Action mailed May 5, 2020 for U.S. Appl. No. 16/137,292.
Yen, Syling, Final Office Action mailed Apr. 10, 2019 for U.S. Appl. No. 15/186,519.
Yen, Syling, Final Office Action mailed Oct. 25, 2019 for U.S. Appl. No. 15/186,519.
Yen, Syling, Non-Final Office Action mailed Feb. 8, 2019 for U.S. Appl. No. 15/186,519.
Yen, Syling, Non-Final Office Action mailed Sep. 12, 2019 for U.S. Appl. No. 15/186,519.
Yotova, Polina, European Patent Office Examination Report, Communication Pursuant to Article 94(3) EPC for European Patent Application No. 17815970.3 mailed Oct. 5, 2021.
Yotova, Polina, Supplementary European Search Report and Examiner Search Opinion for European Patent Application No. 17815970.3, Feb. 21, 2020.
Young, Lee W., International Searching Authority, Notification of Transmittal of the International Search Report and the Written Opinion of the International Searching Authority, or the Declaration for International Patent Application No. PCT/US2017/037846, mailed Nov. 9, 2017.
Young, Lee W., International Searching Authority, Notification of Transmittal of the International Search Report and the Written Opinion of the International Searching Authority, or the Declaration for International Patent Application No. PCT/US2018/020812, mailed Aug. 8, 2018.
Young, Lee W., Invitation to Pay Additional Fees And, Where Applicable, Protest Fee, Mailed Jun. 14, 2018 for International Application No. PCT/US2018/020812.
Young, Lee W., Notification of Transmittal of the International Search Report and the Written Opinion of the International Searching Authority, or the Declaration mailed May 29, 2018 for International Patent Application No. PCT/US2018/018906.
Young, Lee W., Notification of Transmittal of the International Search Report and the Written Opinion of the International Searching Authority, or the Declaration for International Application No. PCT/US2011/057334, mailed Mar. 22, 2012.
Ganti et al., U.S. Appl. No. 14/058,206, filed Oct. 18, 2013 and entitled, "Curated Answers Community Automatically Populated Through User Query Monitoring."
Hu, Xiaoqin, Non-Final Office Action mailed Jul. 30, 2021 for U.S. Appl. No. 16/732,261.
Hu, Xiaoqin, Non-Final Office Action mailed Mar. 29, 2023 for U.S. Appl. No. 17/680,212.
Hu, Xiaoqin, Non-Final Office Action mailed Sep. 2, 2021 for U.S. Appl. No. 16/732,263.
J. Perez, M. Arenas, C. Gutierrez, "Semantics and Complexity of SPARQL," ACM Transactions on Database Systems (TODS), Vo. 34, No. 3, Article 16, Publication Date: Aug. 2009.
Jacob et al., "Collaborative Dataset Consolidation Via Distributed Computer Networks," U.S. Appl. No. 16/120,057, filed Aug. 31, 2018.
Jacob et al., "Collaborative Dataset Consolidation Via Distributed Computer Networks," U.S. Appl. No. 16/287,967, filed Feb. 27, 2019.
Jacob et al., "Dataset Analysis and Dataset Attribute Inferencing To Form Collaborative Datasets," U.S. Appl. No. 16/271,263, filed Feb. 8, 2019.
Jacob et al., "Dataset Analysis and Dataset Attribute Inferencing To Form Collaborative Datasets," U.S. Appl. No. 16/292,120, filed Mar. 4, 2019.
Nguyen, Kim T., Non-Final Office Action mailed Nov. 27, 2020 for U.S. Appl. No. 15/985,705.
Nguyen, Kim T., Non-Final Office Action mailed Oct. 14, 2020 for U.S. Appl. No. 15/943,629.
Nguyen, Kim T., Non-Final Office Action mailed Oct. 14, 2020 for U.S. Appl. No. 15/943,633.
Nguyen, Kim T., Non-Final Office Action mailed Oct. 27, 2020 for U.S. Appl. No. 15/985,702.
Nguyen, Kim T., Non-Final Office Action mailed Oct. 5, 2020 for U.S. Appl. No. 15/927,004.
Nguyen, Kim T., Non-Final Office Action mailed Oct. 5, 2020 for U.S. Appl. No. 15/927,006.
Spieler, William, Non-Final Office Action mailed Jul. 9, 2021 for U.S. Appl. No. 16/435,196.
Tirmizi, S., Sequeda, J., Miranker, D., "Translating SQL Applications to the Semantic Web," In Proceedings of the 19th International Databases and Expert Systems Application Conference (DEXA2008). Turin, Italy. 2008.
U.S. Appl. No. 16/251,408, filed Jan. 18, 2019.
Uddin, MD I, Non-Final Office Action mailed May 13, 2021 for U.S. Appl. No. 16/404,113.
Uddin, MD I., Final Office Action mailed Jan. 1, 2021 for U.S. Appl. No. 16/404,113.
Uddin, MD I., Non-Final Office Action mailed Oct. 6, 2020 for U.S. Appl. No. 16/404,113.

* cited by examiner

DETERMINING A DEGREE OF SIMILARITY OF A SUBSET OF TABULAR DATA ARRANGEMENTS TO SUBSETS OF GRAPH DATA ARRANGEMENTS AT INGESTION INTO A DATA-DRIVEN COLLABORATIVE DATASET PLATFORM

CROSS-REFERENCE TO APPLICATIONS

This application is a continuation application of U.S. patent application Ser. No. 16/137,297, filed Sep. 20, 2018 and titled, "DETERMINING A DEGREE OF SIMILARITY OF A SUBSET OF TABULAR DATA ARRANGEMENTS TO SUBSETS OF GRAPH DATA ARRANGEMENTS AT INGESTION INTO A DATA-DRIVEN COLLABORATIVE DATASET PLATFORM," U.S. patent application Ser. No. 16/137,297 is a continuation-in-part application of U.S. patent application Ser. No. 15/454,923, filed on Mar. 9, 2017, now U.S. Pat. No. 10,353,911 and titled "COMPUTERIZED TOOLS TO DISCOVER, FORM, AND ANALYZE DATASET INTERRELATIONS AMONG A SYSTEM OF NETWORKED COLLABORATIVE DATASETS," U.S. patent application Ser. No. 16/137,297 is a continuation-in-part application of U.S. patent application Ser. No. 15/926,999, filed on Mar. 20, 2018, now U.S. Pat. No. 11,016,931 and titled "DATA INGESTION TO GENERATE LAYERED DATASET INTERRELATIONS TO FORM A SYSTEM OF NETWORKED COLLABORATIVE DATASETS," U.S. patent application Ser. No. 16/137,297 is a continuation-in-part application of U.S. patent application Ser. No. 15/927,004, filed on Mar. 20, 2018, now U.S. Pat. No. 11,036,716 and titled "LAYERED DATA GENERATION AND DATA REMEDIATION TO FACILITATE FORMATION OF INTERRELATED DATA IN A SYSTEM OF NETWORKED COLLABORATIVE DATASETS," U.S. patent application Ser. No. 16/137,297 is a continuation-in-part application of U.S. patent application Ser. No. 15/985,702, filed on May 22, 2018, and titled "COMPUTERIZED TOOLS TO DEVELOP AND MANAGE DATA-DRIVEN PROJECTS COLLABORATIVELY VIA A NETWORKED COMPUTING PLATFORM AND COLLABORATIVE DATASETS," U.S. patent application Ser. No. 16/137,297 is a continuation-in-part application of U.S. patent application Ser. No. 15/985,704, filed on May 22, 2018, and titled "COMPUTERIZED TOOLS TO FACILITATE DATA PROJECT DEVELOPMENT VIA DATA ACCESS LAYERING LOGIC IN A NETWORKED COMPUTING PLATFORM INCLUDING COLLABORATIVE DATASETS," all of which are herein incorporated by reference in their entirety for all purposes. This application is also related to U.S. patent application Ser. No. 16/137,292, filed on Sep. 20, 2018, and titled "MATCHING SUBSETS OF TABULAR DATA ARRANGEMENTS TO SUBSETS OF GRAPHICAL DATA ARRANGEMENTS AT INGESTION INTO DATA DRIVEN COLLABORATIVE DATASETS," and U.S. patent application Ser. No. 16/395,036, filed on Apr. 25, 2019, and titled "COMPUTERIZED TOOLS CONFIGURED TO DETERMINE SUBSETS OF GRAPH DATA ARRANGEMENTS FOR LINKING RELEVANT DATA TO ENRICH DATASETS ASSOCIATED WITH A DATA-DRIVEN COLLABORATIVE DATASET PLATFORM," both of which are incorporated by reference.

FIELD

Various embodiments relate generally to data science and data analysis, computer software and systems, and wired and wireless network communications to interface among repositories of disparate datasets and computing machine-based entities configured to access datasets, and, more specifically, to a computing and data storage platform to determine degrees of similarity between at least a subset of data associated with an ingested dataset and one or more equivalent or similar subsets of data associated with one or more graph-based data arrangements, the degrees of similarity facilitating preferences or priorities in joining one or more graph-based data arrangements to the ingested dataset, according to at least some examples.

BACKGROUND

Advances in computing hardware and software have fueled exponential growth in the generation of vast amounts of data due to increased computations and analyses in numerous areas, such as in the various scientific and engineering disciplines, as well as in the application of data science techniques to endeavors of good-will (e.g., areas of humanitarian, environmental, medical, social, etc.). Also, advances in conventional data storage technologies provide an ability to store an increasing amount of generated data. Consequently, traditional data storage and computing technologies have given rise to a phenomenon in which numerous desperate datasets have reached sizes and complexities that tradition data-accessing and analytic techniques are generally not well-suited for assessing conventional datasets.

Conventional technologies for implementing datasets typically rely on different computing platforms and systems, different database technologies, and different data formats, such as CSV, TSV, HTML, JSON, XML, etc. Known data-distributing technologies are not well-suited to enable interoperability among datasets. Thus, many typical datasets are warehoused in conventional data stores, which are known as "data silos." These data silos have inherent barriers that insulate and isolate datasets. Further, conventional data systems and dataset accessing techniques are generally incompatible or inadequate to facilitate data interoperability among the data silos. Various, ad hoc and non-standard approaches have been adopted, but each standard approach is driven by different data practitioners each of whom favor a different, personalized process.

As graph-based data structures grow at increasing rates (e.g., at arithmetical or exponential rates), the complexity with which to match data between a newly-uploaded dataset and previously-uploaded datasets increases correspondingly. Typically, datasets of various types of formats, such as CSV, TSV, HTML, JSON, XML, etc., require additional processing, including manual intervention, to identify related datasets that may be disposed, for example, in graph-based data arrangements. For instance, some conventional data formats are designed for relational database architectures, which generally known for being difficult to scale as data and related datasets increase in size. As such, relational databases of large sizes are not well-suited for expeditiously identifying classes or types of data over large-scaled data arrangements with which to join a newly-added dataset. Furthermore, for any particular class or type of data, there may be numerous subsets of related data that describe attributes of a similar class. For example, a column of zip code data may be relatable to hundreds of thousands or millions (or greater) of subsets of data in one or more graph data arrangements, whereby the subsets of data may be disposed in corresponding graph datasets. Conventional filtering or data identification techniques (e.g., for relational databases) are generally suboptimal in identifying a number of suitable datasets with which to join.

Thus, what is needed is a solution for facilitating techniques to optimize data operations applied to datasets to identify equivalent data, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
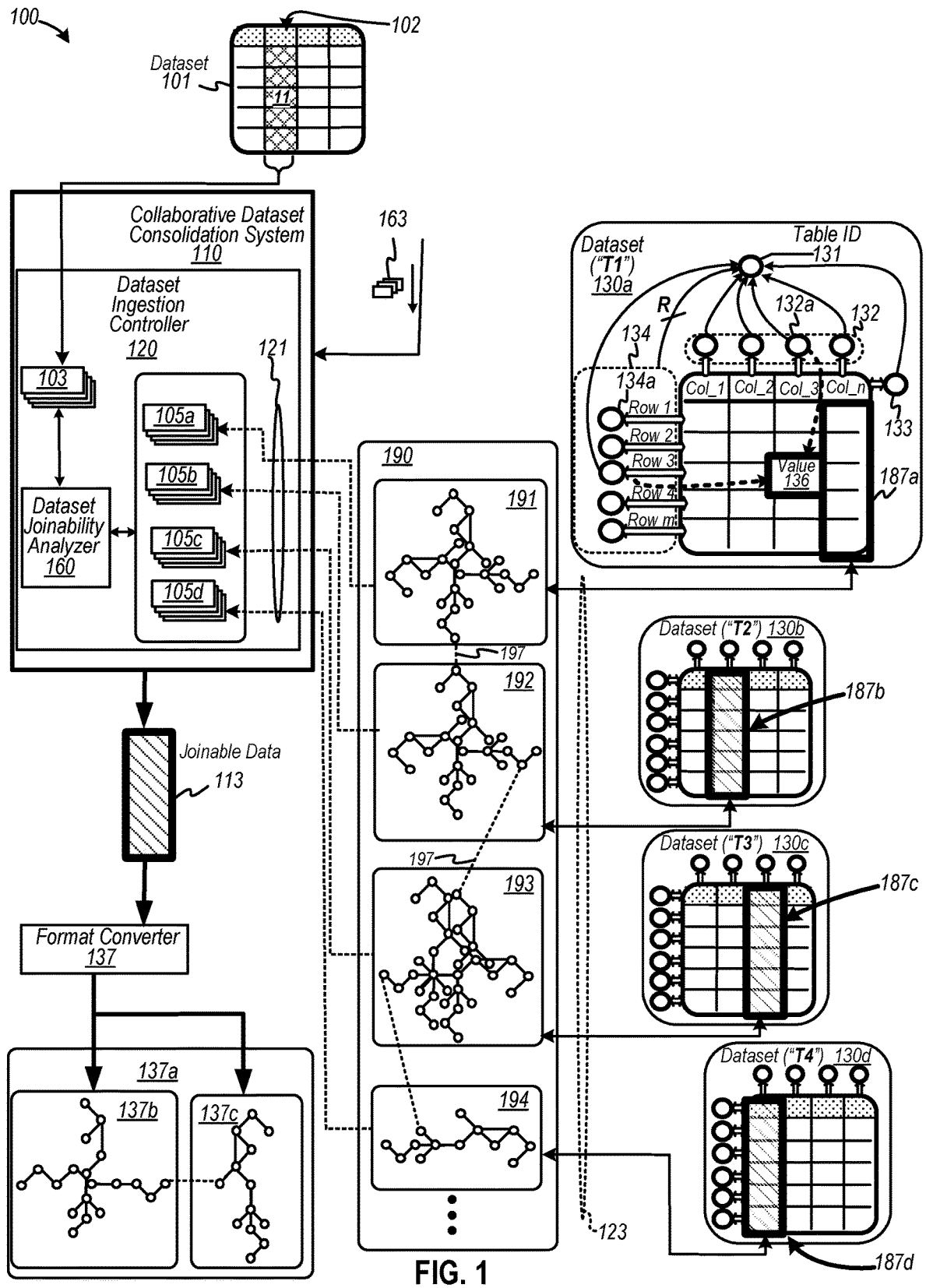
FIG. 1 is a diagram depicting an example of a collaborative dataset consolidation system configured to determine degrees of similarity among datasets to identify a dataset with which to join, according to some embodiments.

FIG. 1 is a diagram depicting an example of a collaborative dataset consolidation system configured to determine degrees of similarity among datasets to identify a dataset with which to join, according to some embodiments. Diagram 100 depicts a tabular data arrangement that may be ingested into a collaborative dataset consolidation system 110, wherein a tabular data arrangement 101 may include subsets of data. An example of a subset of data may include data (e.g., columnar data) disposed in column 102, and, in some examples, may include a portion of an external dataset that may be ingested. An external dataset may be stored remotely, without collaborative dataset, consolidation system 110. Each unit of columnar data may be disposed in data fields, such as cells 11, of data arrangement 101. In some examples, tabular data arrangement 101 may be implemented as a data file including multiple tables split into different files or sheets, such as a data arrangement for a spreadsheet computer program application.

Diagram 100 further depicts collaborative dataset consolidation system 110 including a dataset ingestion controller 120, which may be configured to determine which one or more of one or more linked portions datasets, such as graph-based datasets 191, 192, 193, and 194, are most relevant to table-formatted dataset 101. Note, graph-based datasets 191, 192, 193, and 194 may correspond to subsets or portions of a graph data arrangement 190. Identification of which graph-based data sets 191, 192, 193, and 194 are most relevant to data in dataset 101 may be based on a determination of a degree of "joinability," which may quantitatively describe gradations of relevancy among datasets (including data in dataset 101) so that an optimal number of datasets may be identified among a large number of suitable datasets in graph data arrangement 190. Joinability of ingested dataset 101 and a graph-based dataset 191 to 194 may be based on a computed degree of similarity between subsets of data (e.g., ingested columnar data in column 102 and a subset of a graph dataset 191 to 194). Thus, a degree of joinability may be a function of a degree of similarity between subsets of data. In some implementations, various values for degrees of joinability between dataset 101 and graph-based datasets 191, 192, 193, and 194 may be indicative of a ranking or prioritizing each of datasets 191, 192, 193, and 194 relative to each other. Also, data representing ranked graph-based datasets 191, 192, 193, and 194 based on joinability may be presented at a user interface of a computing device (not shown) to receive user input data indicating a selection to join one of graph-based datasets 191, 192, 193, and 194 to dataset 101.

Dataset ingestion controller 120 is shown to include a dataset joinability analyzer 160, which may be configured to determine data attributes (e.g., similarity attributes) with which to determine degrees of similarity among subsets of data. A similarity attribute may describe a quality of one or more units of data that may facilitate identification of a degree of similarity. Dataset joinability analyzer 160 may be configured to generate any number of compressed data representations for each unit of data (e.g., datum 11) in column 102, whereby dataset joinability analyzer 160 may further be configured to compress data differently to form each of the number of compressed data representations (e.g., different compression subprocesses, algorithms, functions, etc.). For each group of similarly-compressed data values, dataset joinability analyzer 160 may identify at least one target compressed data value from the group of similarly-compressed data values, and aggregate each of the target compressed data values 103 to form a similarity matrix. Similarly, dataset joinability analyzer 160 may be configured to generate any number of compressed data representations for each unit of data (e.g., linked to a node of a graph) in a subset or portion of a graph-based dataset (e.g., one of graph-based datasets 191, 192, 193, and 194). And for each graph-based datasets 191, 192, 193, and 194, dataset joinability analyzer 160 may also be configured to compress data differently to form each of the number of compressed data representations differently. Dataset joinability analyzer 160 may identify at least one target compressed data value from each group of similarly-compressed data values for each of graph-based datasets 191, 192, 193, and 194, and may further aggregate each of the target compressed data values 105a, 105b, 105c, and 105d to form similarity matrices for graph-based datasets 191, 192, 193, and 194, respectively. According to some examples, similarity matrices 103 and 105a to 105d may be implemented as, or referred to, "similarity signatures" for corresponding subsets of data.

Dataset joinability analyzer 160 may operate to analyze data in similarity matrix 103 with data in one or more similarity matrices 105a to 105d. For example, dataset joinability analyzer 160 may be configured to compare or match similarly-compressed target compressed data values between similarity matrix 103 and one of similarity matrices 105a to 105d to generate a data representation (e.g., a number, percentage, etc.) that specifies a degree of similarity between, for example, subset 102 and a subset of data in graph-based datasets 191, 192, 193, and 194. In this example, degrees of similarity between subset 102 and each of graph-based datasets 191, 192, 193, and 194 are likely qualitatively different, whereby degrees of similarity may be ranked or prioritized from lowest to highest, for example. A higher degree of similarity between subsets of datasets may define that a corresponding degree of joinability between datasets may also have a higher value than others, at least in some cases.

Further, data representations indicating a degree of joinability (e.g., a degree of similarity) may specify a ranking of dataset to join with dataset 101, as well as dataset identification data and any other data to link data in dataset 101 to data in graph data arrangement 190 via data in column 102. The data representations and other data may constitute joinable data 113, which may specify which one or more of graph-based datasets 191, 192, 193, and 194 may be joined to data from dataset 101. According to some examples, joinable data 113 may be generated or otherwise influenced responsive to user input data received from a user interface of a computing device (not shown).

In at least one example, a classification type for columnar data in column 102 may be determined to, for example, identify which subsets of data in graph data arrangement 190 that may have a similar or equivalent types or classes of data. By determining or identifying graph-based datasets 191, 192, 193, and 194 as having similar or equivalent types or classes of data as column 102, probabilistic confidence and accuracies of determining degrees of similarity among subset are enhanced, thereby conserving resources in determining which dataset may be joined with dataset 101. In on implementation, dataset ingestion controller 120 may receive data 163 indicating a class, category, or type of data related to column data 102 to direct similarity determinations to similar or equivalent subsets of data. Data 163 may be configured to identify classification types for graph-based datasets 191, 192, 193, and 194, and may be generated as input data from a graphical user interface (not shown). Accordingly, similarity matrices 103 and 105a to 105d may be describe data attributes for data relevant to similar or equivalent entities, classes, classifications, and/or types.

In some examples, data 163 or any other data may specify a classification type, which may be described as a "classification," or an "entity class," under which data may be categorized. Examples of classification types include postal zip codes, industry sector codes, such as NACIS ("North American Cartographic Information Society") codes or SIC ("Standard Industrial Classification") codes, country codes (e.g., two-character, three-character, etc.), airport codes, animal taxonomies (e.g., classifications of "fish" or any other animal), state codes (e.g., two-letter abbreviation, such as TX for Texas, etc.), medical codes, such as ICD ("International Classification of Diseases") codes, including the ICD-10-CM revision, airport codes, such as three-letter "IATA" codes defined by the International Air Transport Association, and the like. The above-described examples regarding classification are non-limiting, and a classification type or entity class of data may describe any type of data that can be categorized, such as any data set forth in an ontology (e.g., data defining categories, properties, data relationships, concepts, entities, etc.). An example of one type of ontology is an ontology created using the W3C Web Ontology Language ("OWL"), as a semantic web language, regardless whether the ontology is open source, publicly-available, private, or proprietary (e.g., an organizationally-specific ontology, such as for use in a corporate entity).

To illustrate operation of dataset ingestion controller 120, consider column 102 includes a number of ZIP Codes in the state of Texas, whereas subsets of data within portions 191, 192, 193, and 194 of graph data arrangement 190 may include a number of ZIP Codes for the entire United States, which may be a superset of data in column 102, or may include any combination and amount of data relating to postal codes. For example, portions 191, 192, 193, and 194 of graph data arrangement 190 may include individual state zip codes (e.g., Florida state zip codes), zip codes for central time zone states, postal codes of all 50 U.S. states, postal codes for U.S. states and territories, and/or international postal codes. Rather than comparing data in each cell 11 to units of data (e.g., at or associated with graph nodes) in graph-based data sets 191, 192, 193, and 194, dataset ingestion controller 120 may be configured to analyze reduced or compressed amounts of data embodied in similarity digital signatures 103 and 105a to 105d. Thus, dataset ingestion controller 120 may be configured to determine or detect one or more links 121 between column 102 of data via similarity digital signature 103 (e.g., as a similarity matrix) to one or more datasets 191, 192, 193, and 194 via similarity matrices 105a-105d.

In at least some examples, dataset ingestion controller 120 and/or other components of collaborative dataset consolidation system 110 may be configured to implement linked data as one or more canonical datasets with which to modify, query, analyze, visualize, and the like. In some examples, dataset ingestion controller 120 and/or other components of collaborative dataset consolidation system 110 may be configured to form associations between a portion of a graph-based dataset and a table-based dataset (e.g., form associations among graph-based dataset 191 and table-based dataset 130a). For example, format converter 137, which may be disposed in dataset ingestion controller 120, can be configured to form referential data (e.g., IRI data, etc.) to associate a datum (e.g., a unit of data) in a graph data arrangement (e.g., any of graph-based datasets 191 to 194) to a portion of data, such as one of columns 187a to 187d, in a tabular data arrangement (e.g., any of table-based datasets 130*a* to 130*d*). Thus, data operations, including dataset enrichment (e.g., joining data to expand datasets using a degree of joinability) and queries, may be applied against a datum of the tabular data arrangement as the datum in the graph data arrangement. An example of a component of collaborative dataset consolidation system 110 to form associations between a portion of a graph-based dataset and a table-based dataset may be as described in U.S. patent application Ser. No. 15/927,004, filed on Mar. 20, 2018, and titled "LAYERED DATA GENERATION AND DATA REMEDIATION TO FACILITATE FORMATION OF INTERRELATED DATA IN A SYSTEM OF NETWORKED COLLABORATIVE DATASETS."

As shown, dataset ingestion controller 120 may be configured to identify graph-based datasets that may be transformed or associated with tabular data formats, such as a dataset ("T1") 130*a*, dataset ("T2") 130*b*, dataset ("T3") 130*c*, dataset ("T4") 130*d*, among others. For example, dataset ingestion controller 120 may form associations via nodes and links (e.g., semantically linked data) to associate each data value 136 in a cell of a tabular data arrangement. Value 136 also may be linked to a row node 134*a* (of a group ("R") of row nodes 134) and a column node 132*a* (of a group ("C") of column nodes 132). Node 133 may identify via links to column header data that may be used to classify data (e.g., as zip codes) or identify a datatype (e.g., a string, number, integer, Boolean, etc.), in accordance with some instances. As shown, data in tabular data arrangement 130*a* may be converted from/to a graph data arrangement 191, such that data values 136 in table 130*a* may be mirrored or mapped into graph data arrangement 191. Table 130*a* may be identified by data representing a table identifier ("ID") 131, whereby data values in each cell of a table format may be linked or otherwise associated with a node in a graph data format. In some examples, dataset 130*a*, dataset 130*b*, dataset 130*c*, dataset 130*d* may be "virtual" datasets, whereby data in datasets 130*a* to 130*d* either resides in graph data arrangement 190 or external to collaborative dataset consolidation system 110 (e.g., data is linked from external sources). As such, data (including metadata) may be associated with graph data arrangement 190 to access or view graph data as tabular data (e.g., for presentation in a user interface or for application of SQL-like queries).

Further to the example shown, consider that each similarity matrix 105*a* to 105*d* may be a digital signature referencing subsets of graph data subsets 191 to 194, respectively, via links 121. In addition, each of subsets of graph data subsets 191 to 194 may be associated via links 123 with a column 187*a* to 187*d*, respectively, in corresponding tabular data arrangements 130*a* to 130*d*. For example, consider that similarity matrix 103 matches, or correlates to, similarity matrix 105*d*, which in turn, is associated via one of links 123 to graph data 194. So if column 102 is associated with a specific classification type, such as "zip codes of Texas," a degree of similarity between similarity matrices 103 and 105*d* may indicate that graph data portion 194 may include joinable zip code data, such as "the zip codes of the United States." Further, dataset ingestion controller 120 may be configured to enrich dataset 101 by adding data in column 187*d*, which maps to data in graph data portion 194, to dataset 101 to form an enriched version of dataset 101. Thus, data in column 187*d* may be added as supplemental data into data from dataset 101, based on comparing similarity matrix 103 to similarity matrix 105*d*.

Dataset ingestion controller 120 may be configured to perform other functionalities with which to form, modify, query and share collaborative datasets according to various examples. In this example, dataset 101 may be disposed in a first data format (e.g., a tabular data arrangement), with which format converter 137 may convert into a second data arrangement, such as a graph data arrangement 137*b*. Graph data arrangement 137 may include (e.g., via links) a graph data portion 137*b* from data in dataset 101 and a graph data portion 137*c* from "similar" data in, for example, graph data portion 194. As such, data in a field 11 (e.g., a unit of data in a cell at a row and column) of a table 101 may be disposed in association with a node in a graph 137 (e.g., a unit of data as linked data).

According to some examples, graph dataset portions 191 to 194 may be linkable to each other via links 197, or to other graph data arrangements (not shown). Thus, upon determining a degree of similarity between similarity matrix 103 and one of similarity matrices 105, then dataset ingestion controller 120 may be configured to link additional datasets for other classification types based on the data identifies in joinable data 113 (e.g., one or more links relevant to dataset 101 based on degrees of similarity). For example, if joinable 113 references zip codes, then data in other graph data portions, such as graph data portions 191 to 194, may be "inferred" as being relevant for joining. Other graph data portions may include geographic location data (e.g., longitudinal and latitudinal coordinates) associated with a zip code, demographic senses data associated with a zip code, state abbreviation codes associated with a zip code, a counting name associated with a zip code, and any other data associated with a zip code classification type (or other associated classification types).

According to some examples, collaborative dataset consolidation system 110 and/or any of its constituent components may implement a software algorithms or platforms composed of one or more programs or scripts (e.g., Java®, JavaScript®, JSON™, Ruby, C+, C++, C#, C, or any other structured or unstructured programming language, structured or unstructured, or the like, including, but not limited to, SQL, SPARQL, TURTLE, etc.) that is configured to determine degrees of similarity. In some examples, the above-described compressed data representations and similarity matrices may be implement printing using hash functions and hash values. In at least one implementation, multiple sets of similarity matrices, such as 103, may be used to further enhance determinations of degrees of joinability. For example, a first similarity matrix 103 may be directed to zip code data and a second similarity matrix 103 (not shown) may be directed to employment data (based on type of industry). Corresponding sets of multiple similarity matrices for datasets 191 to 194 may also be generated. Thus, multiple sets of degrees of similarity may be determined, combination of which may be used to enhance a degree of joinability. For example, degrees of similarity relating to zip code-related data may be weighted more than degrees of similarity relating to employment data, whereas the weighted combination of degrees of similarity may be used to compute a degree of joinability.

In view of the foregoing, one or more structures and/or one or more functionalities described in FIG. 1 (or anywhere herein) may be configured to expeditiously identify relevant data of an ingested dataset in a first data format, such as a tabular data arrangement 101, with one or more linked datasets disposed in a second data format, such as a graph data arrangement 190. Relevant data may be identified during data ingestion for joining with similar data, and storage in the graph data arrangement. According to various examples, data in a tabular data arrangement 101 may be matched against data in a graph data arrangement, which may reduce or negate reduce complexities and limitations associated with relational database architectures. Further, analysis of target compressed data, using a similarity matrix, preserves computational resources that otherwise may be used to perform per-cell matching rather at a subset (or column) level. In some examples, determining degrees of similarity based on class types of categories (or classification) may enhance accuracy in the determination of the computed degrees of similarity, which, in turn, may influence selection of joining a specific portion of graph data arrangement 190 to data in dataset 101. In at least some cases, degrees of joinability and/or similarity may be distinguished by ranking, prioritization, or the like, so as to reduce or negate obscuring selections of graph-based datasets in view of the very large numbers of linked datasets in a graph data arrangement.

Figure 2:
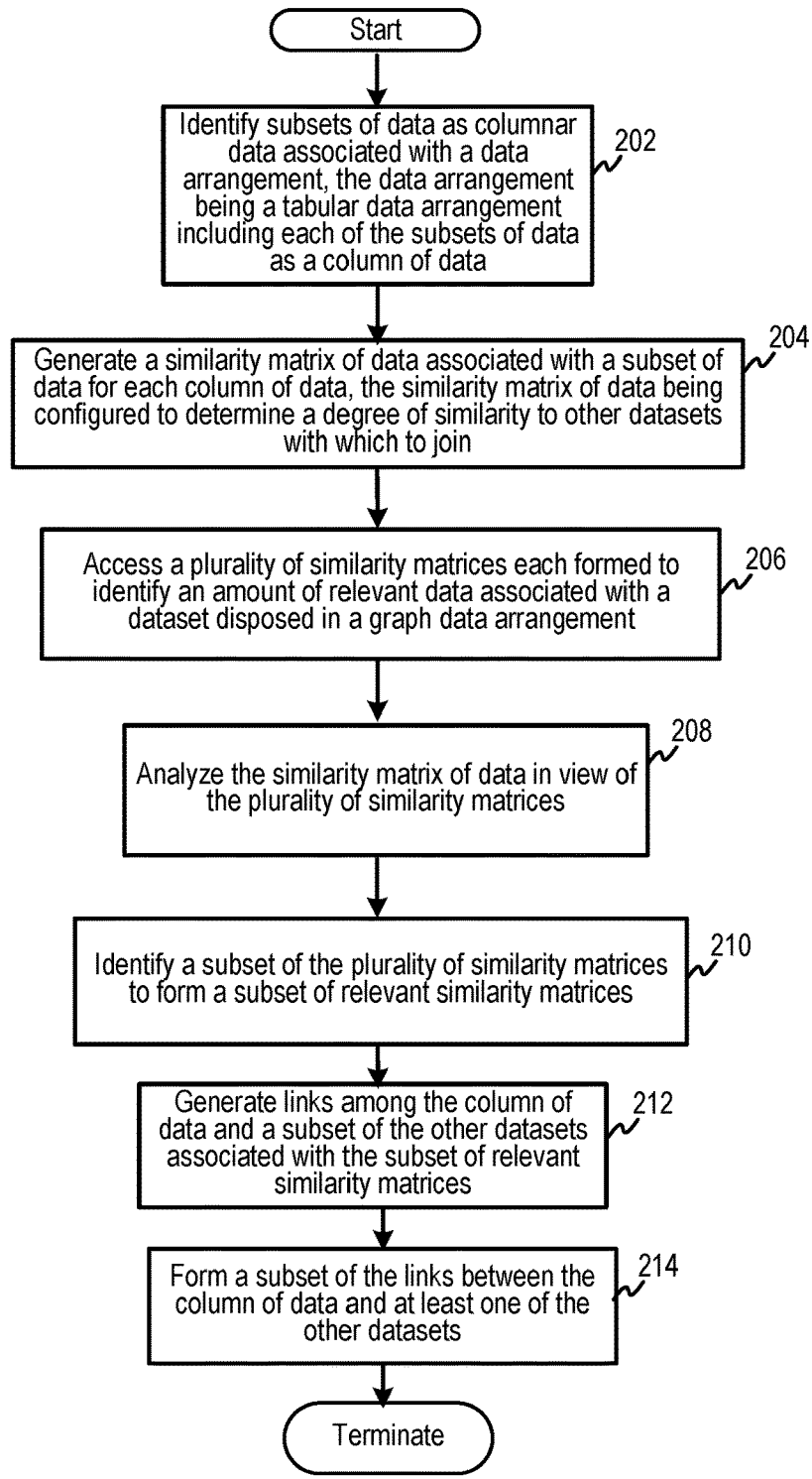
FIG. 2 is a flow diagram depicting an example of identifying one or more degrees of similarity, each of which being indicative that at least a portion of a graph-based dataset may be relevant to data associated with an ingested dataset, according to some embodiments.

FIG. 2 is a flow diagram depicting an example of identifying one or more degrees of similarity, each of which being indicative that at least a portion of a graph-based dataset may be relevant to data associated with an ingested dataset, according to some embodiments. In some examples, flow diagram 200 may be implemented in association with a collaborative dataset consolidation system, such as system 110 of FIG. 1. Further, flow diagram 200 may be facilitated via computerized tools including a data project interface, which may be configured to initiate and/or execute instructions to identify data of an ingested dataset, such as a table, that may be relevant with one or more linked datasets stored in a graph-based data arrangement.

At 202, one or more subsets of data associated with a data arrangement may be identified at (or approximate to) ingestion into a computing platform, such as (but not limited to) a collaborative dataset consolidation system. In some examples, a tabular data arrangement may be ingested into the computing platform, whereby subsets of data in a table may constitute columnar data (e.g., data disposed in a column, or otherwise associated with links to transform the data into columns based on data disposed in graph-based data arrangements).

At 204, a similarity matrix of data associated with a subset of data may be generated. In some examples, a subset of data may include data that may reference a columnar data structure, or otherwise may be disposed or linked to data in a graph data arrangement. A similarity matrix of data may be configured to determine or otherwise specify a degree of similarity that may be used to identify other datasets with which to join, according to some examples. Also, a similarity matrix of data may be composed of a number of compressed data representations, each of which may be generated by one or more different processes or algorithms, such as one or more different hash functions. The compressed data representations of a similarity matrix may include units of compressed target data that may be used to compare or otherwise analyzed against other units of compressed target data for graph-based data. A unit of compressed target data may represent a value of a compressed target data unit that may be implemented to form a degree of similarity. In at least one implementation, a value of a compressed target data unit may represent a target hash value (e.g., a minimum hash value). Note that multiple hash functions may be applied to at least one column of tabular data ingested into collaborative dataset consolidation platform to form one or more similarity matrices of data. According to at least one example, a similarity matrix of data may be referred to as a signature, such as a "similarity signature." A similarity matrix of data may include units of compressed target data 358a, 358b, . . . , and 358n, each of which may represent a target hash value for a corresponding hash function, according to at least one example.

At 206, a number of similarity matrices stored in a repository may be accessed to determine a degree of similarity with ingested columnar data associated with the similarity matrix generated in 204. The number of similarity matrices may be formed to identify an amount of relevant data associated with datasets disposed in a graph data arrangement. According to some examples, a degree of similarity may specify or describe an amount of relevant data (e.g., as relevant content) between an ingested column of data and a subset of graph data stored in a graph data arrangement for a similar or equivalent class or type of data. To illustrate, consider that an ingested tabular dataset may include a U.S. postal zip codes for the state of Texas. In various examples, the zip codes for states in the central time zone may be more relevant than stored datasets including subsets of data including zip codes for all 50 states plus U.S. territories (e.g., Guam, Puerto Rico, etc.). States in the central time zone include at least Alabama, Arkansas, Minnesota, Wisconsin, Illinois, Missouri, Arkansas, Oklahoma, and Texas. A degree of similarity, according to some implementations, may describe or indicate a computed amount of "overlap" or "coverage" between a column of Texas zip code data and other subsets of data in datasets that may include individual state zip codes (e.g., Texas zip codes), zip codes for central time zone states, postal codes of the 50 U.S. states, postal codes for U.S. states and territories, and/or international postal codes.

At 208, a similarity matrix of data may be analyzed in association with a number of other similarity matrices, such as a set of similarity matrices formed for subsets of data, which may include similar or equivalent classes or types of data. According to some examples, analyzing a similarity matrix may include computing a degree of similarity as a function of common data attributes values and combined data attribute values for an ingested subset of data (e.g., an ingested column of data) and for at least one subset of graph data. In at least one example, common data attributes values may be derived as an intersection of data attributes values between the ingested subset of data and at least one subset of graph data to perform, for example, an "overlap" function as described herein. The combined data attribute values may be derived as a union between the subsets. In another example, analyzing a similarity matrix may include performing a coverage function. In this case, analyzing a similarity matrix may include computing a degree of similarity as a function of data attributes values in an ingested subset of data with respect to combined data attribute values for the ingested subset of data (e.g., an ingested column of data) and at least one subset of graph data.

At 210, a subset of similarity matrices relevant to an ingested subset of data may be identified. In some examples, an identified subset of similarity matrices may be associated with degrees of similarity that, for example, may exceed a threshold that specifies sufficient similarity. Or, an identified subset of similarity matrices may be associated with degrees of similarity that otherwise may comply with a range of degrees of similarity that specify sufficient similarity. A computed degree of similarity may be expressed numerically (e.g., as a percentage) or by using any other symbolic expression. Thus, a computed degree of similarity may be ranked or otherwise prioritized among other degrees of similarity to identify, for example, subsets of data that may be most highly relevant as compared to less relevant subsets of data.

According to various examples, "joinability" of an ingested dataset and a graph-based dataset may be based on a quantification of a degree of similarity between subsets of data (e.g., ingested columnar data and a subset of a graph). Thus, a degree of joinability between an ingested dataset and a graph-based dataset may be a function of a degree of similarity between subsets of data. One or more links or associations may be formed between ingested columnar data and a subset of a graph. In some examples, links may be formed among the ingested columnar data, which is converted into a graph-based data format, and a subset of a graph-based data arrangement. At 212, links among a column of data (e.g., an ingested subset of a tabular data arrangement) may be formed with a subset of the other datasets associated with a subset of relevant similarity matrices. The subset of relevant similarity matrices may be determined based on the degrees of similarity that meet the above-described threshold or ranges of similarity.

At 214, a subset of links may be formed between a column of data and at least one of the other datasets. In one implementation, links (e.g., suggested links) may be presented in a user interface, whereby the links can be presented as data representations for a selection of other datasets in a graph data arrangement to join via links (e.g., selectable links) to join via a column of data to an ingested data arrangement (e.g., an ingested tabular data arrangement). For example, one of a number of selections may be detected as data signals received into a collaborative dataset consolidation platform or system to form a subset of links to join a tabular data arrangement and at least one of other dataset in a graph data arrangement.

Figure 3:
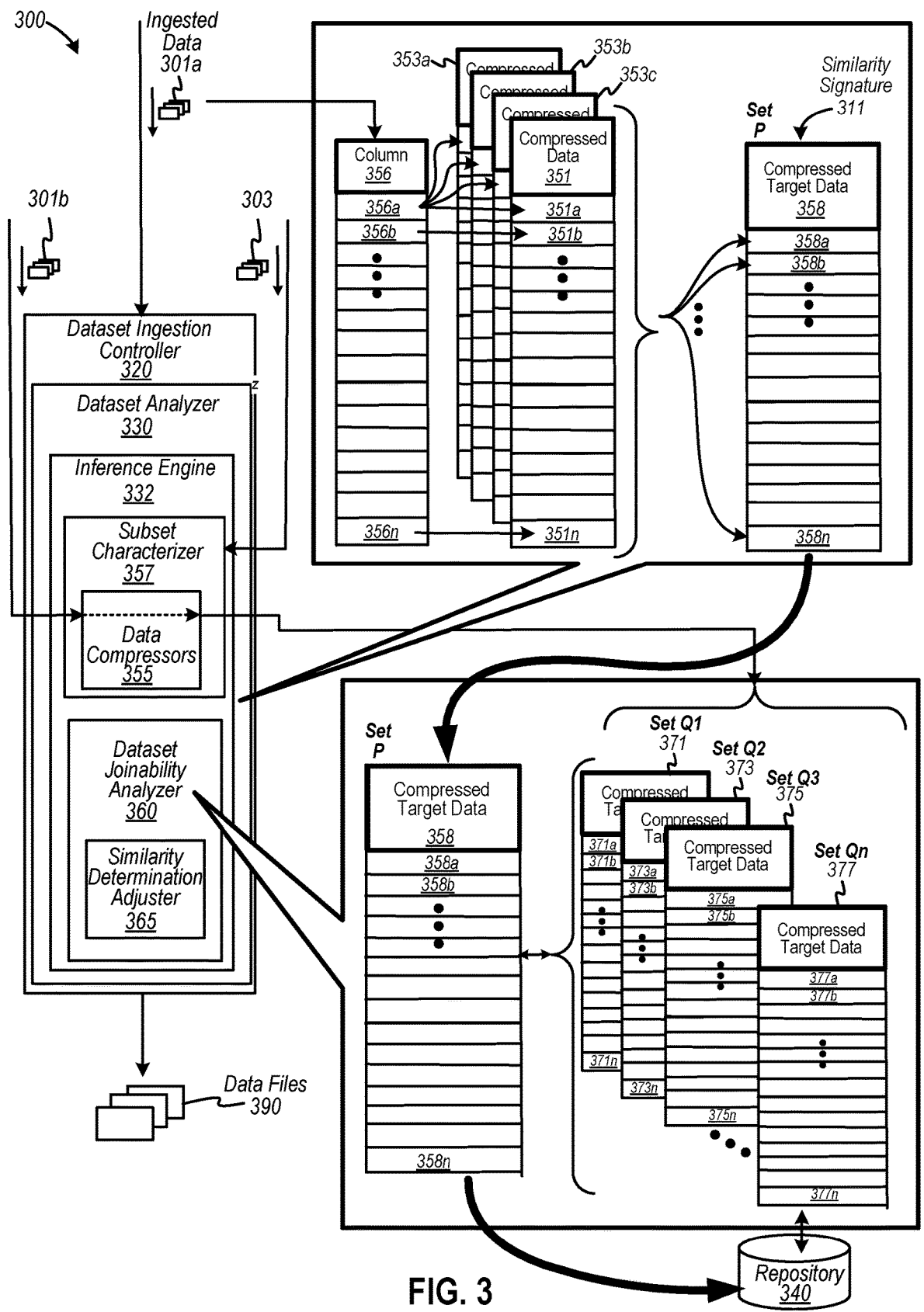
FIG. 3 is a diagram depicting dataset ingestion controller configured to determine a degree of similarity of a subset of tabular data arrangements to subsets of graph-based data arrangements, according to some examples.

FIG. 3 is a diagram depicting dataset ingestion controller configured to determine a degree of similarity of a subset of tabular data arrangements to subsets of graph-based data arrangements, according to some examples. Diagram 300 depicts a dataset ingestion controller 320 including a dataset analyzer 330 and an inference engine 332. Further, inference engine 332 may be configured to further include a subset characterizer 357 and a dataset joinability analyzer 360, either or both of which may be implemented. According to various examples, subset characterizer 357 may be configured to classify units of data in, for example, a column 356 of ingested data 301*a* to determine one or more of an entity class, a classification type, a datatype, a categorical variable, or any dataset attribute associated with column 356, which be equivalent to column 102 of tabular dataset 101 of FIG. 1. A type of data in column 356 may influence determinations of degrees of similarity and/or joinability, at least in some cases. Note that subset characterizer 357 operation may be optional in some cases. In one or more implementations, elements depicted in diagram 300 of FIG. 3 may include structures and/or functions as similarly-named or similarly-numbered elements depicted in other drawings. Examples of may include similar or equivalent structures and/or functionalities of a dataset analyzer and an inference engine as described in U.S. patent application Ser. No. 15/927,004, filed on Mar. 20, 2018, and titled "LAYERED DATA GENERATION AND DATA REMEDIATION TO FACILITATE FORMATION OF INTERRELATED DATA IN A SYSTEM OF NETWORKED COLLABORATIVE DATASET S."

Subset characterizer 357 may be configured to characterize subsets of data by, for example, classifying or associating units of data (e.g., cells of column) with a specific class/classification or type of data (e.g., zip code or postal code data). In some examples, subset characterizer 357 may be configured to receive data 303 indicating a category type of interest to direct similarity determinations to similar or equivalent subsets of data. In operation, subset characterizer 357 may receive data 303 as input data generated from a graphical user interface. In at least one example, data 303 may include data representing a classification associated with columnar data, whereby data 303 may be generated by a probabilistic data structure, such as a Bloom filter. Examples of structures and/or functions configured to generate classification data 303 may be set forth in U.S. patent application Ser. No. 16/137,292, filed on Sep. 20, 2018 and titled "Matching Subsets of Tabular Data Arrangements to Subsets of Graphical Data Arrangements at Ingestion into Data-Driven Collaborative Datasets," which is herein incorporated by reference.

Subset characterizer 357 is shown to include one or more data compressors 355, each of which may be configured to form a reduced data representation of a characterized subset of data, such as an ingested column 356 of data. Each of data compressors 355 may be configured to generate a compressed data representation 351 for a compressed data representation for units of data (e.g., cells 356*a*, 356*b*, ... 356*n*) of a column 356 of data. In the example shown, a first data compressor may be configured to process units of data 356*a*, 356*b*, ... 356*n* to generate corresponding compressed data representations 351*a*, 351*b*, ... 351*n* to form compressed data 351. A second data compressor may be configured to process units of data 356*a*, 356*b*, ... 356*n* to generate different compressed data representation similar to compressed data representations 351*a*, 351*b*, ... 351*n*, but not shown. Moreover, any number of other data compressors of data compressors 355 may generate other compressed data representations (not shown) in sets 353*a*, 353*b*, and 353*c* of compressed data representations, according to some examples. According to at least some examples, sets or arrays 351, 353*a*, 353*b*, and 353*c* of compressed data each include hash values derived from a corresponding data compressor (e.g., hash function).

For ingested data 301*a*, compressed data representations 351*a*, 351*b*, ... and 351*n* may constitute a set or an array of compressed data representations 351. In one example, dataset joinability analyzer 360 may be configured to analyze compressed data representations 351*a*, 351*b*, ..., and 351*n* to determine a unit of compressed target data, such as a unit of compressed target data 358*a* that is included in compressed target data 358. Further, dataset joinability analyzer 360 may be configured to analyze other compressed data representations in, for example, compressed data 353*a*, 353*b*, and 353*c*, among others, to determine other units of compressed target data in compressed target data 358. For example, dataset joinability analyzer 360 may be configured to analyze compressed data representations in, for example, compressed data 353*a* to determine a unit of compressed target data 358*b* in compressed target data 358. Similarly, dataset joinability analyzer 360 may be configured to analyze other compressed data representations in any of compressed data representations 351, 353*a*-*c*, and the like, to generate other units of compressed target data in compressed target data 358, such as a unit of compressed target data 358*n*.

In some examples, dataset joinability analyzer 360 may be configured to identify a unit of compressed target data in a set of compressed data representations, whereby identification of a unit of compressed target data may be for inclusion in compressed target data 358. To illustrate, consider an example in which compressed data representations, such as compressed data representations 351*a*, 351*b*, ... and 351*n*, may be determined by applying data values 356*a*, 356*b*, and 356*n* to a hash function to generate compressed data representations 351*a*, 351*b*, and 351*n*. As such, compressed data representations 351*a*, 351*b*, and 351*n* may be hash values. Dataset joinability analyzer 360 may select at least one value of compressed data representations 351*a*, 351*b*, . . . and 351*n* to be included in similarity signature 311. For example, dataset joinability analyzer 360 may determine or derive a unit of compressed target data, such as unit 358*n* of compressed target data 358 based on a characteristic of hash values for one of compressed data 351, 353*a*, 353*b*, and 353*c*. According to some examples, the term "compressed target data" may refer, at least in some implementations, to a data value representing a parameter or metric with which to determine (or facilitate the determination of) similarity between data in column 356 and subsets of graph-formatted data. In some cases, a unit of compressed target data may include a hash value having an attribute (e.g., a minimum hash value, or the like), and may be referred as a target hash value. Thus, a characteristic of a hash value may be, for example, a "minimum" hash value, whereby a minimum hash value of compressed data representations 351*a*, 351*b*, and 351*n* may be identified as a unit of compressed target data in compressed target data 358. Other characteristics of a hash value include a maximum hash value, an average hash value, and the like.

Also, compressed target data 358 may be an array or set (e.g., Set P) of parameters or metrics, each of which is derived from a different data compressor and may be used to determine one or more degrees of similarity. Compressed target data representations 358*a*, 358*b*, . . . and 358*n* collectively, at least in some cases, may constitute a "similarity matrix." Similarity signature 311 may provide for the quantification of a degree of similarity between subsets of data (e.g., ingested columnar data and a subset of a graph), which, in turn, may facilitate determination of a degree of joinability between an ingested dataset and a graph-based dataset.

Prior to application of data of column 356 to data compressors 355, data 301*b* from other datasets (e.g., stored datasets in graph data arrangements) may be analyzed and processed by data compressors 355 to generate sets or arrays of compressed target data 371, 373, 375, . . . , and 377, any of which may be stored in repository 340. As shown, sets of compressed data representations 371, 373, 375, . . . , and 377 may constitute "Set Q1," "Set Q2," "Set Q3," and "Set Qn," respectively. According to some examples, sets of compressed data representations 371, 373, 375, . . . , and 377 may constitute similarity matrices.

In some embodiments, each of data compressors 355 may be configured to generate a uniquely compact data value. For example, each of data compressors 355 may be implemented as a differently-configured hash function, such a murmur hash function or any known hash function (e.g., 2x+9 mod 5, 3x+3 mod 2, etc.), to form compressed data representations. These compressed data representations, as one or more different hash values, may be generated as compressed data representations 351*a*, 351*b*, . . . and 351*n*. Further, corresponding differently-formed hash values may be generated for sets of compressed data representations 371, 373, 375, . . . , and 377 using corresponding hash functions.

For example, a first hash function that generates hash value 358*a* may also be used to generate hash values 371*a* in Set Q1, 373*a* in Set Q2, 375*a* in Set Q3, and 377*a* in Set Qn, whereby hash values 371*a*, 373*a*, 375*a*, and 377*a* each constitute a unit of compressed target data (e.g., a minimum hash value). Similarly, a second hash function that generates hash value 358*b* may be used to generate hash values 371*b* in Set Q1, 373*b* in Set Q2, 375*b* in Set Q3, and 377*b* in Set Qn, and an "nth" hash function that generates hash value 358*n* may also be used to generate hash values 371*n*, 373*n*, 375*n*, and 377*n*. Hence, Set P and Sets Q1, Q2, Q3, and Qn each may include a similarity matrix of hash values, according to some examples. According to some examples, hash values in Sets P and Q1 to Qn may be 64 bit wide (or any bit length), and an number of hash values in any of Sets P and Q1 to Qn may range from 20 to 50, or from 20 up to 200, or greater.

Dataset joinability analyzer 360 may be configured to analyze one or more similarity matrices to determine one or more degrees of joinability between an ingested dataset and a graph-based dataset, whereby joinability provides a basis for selecting most relevant (e.g., most likely relevant) graph-based datasets to join with an ingested dataset. The ingested dataset may be in a tabular data format (or any other data format). Further, joinability between an ingested dataset and a graph-based dataset may be based on one or more degrees of similarity among, for example, Set P and Sets Q1, Q2, Q3, and Qn. In some examples, a degree of similarity may be determined as a function of multiple determinations that indicate either an amount of "overlap" between Set P and one of Sets Q, an amount of "coverage" between Set P and one of Sets Q, or the like.

According to various embodiments, an amount of "overlap" may be determined by, for example, computing a degree of similarity as a function of an approximated overlap based on a ratio between an amount of common data attributes (e.g., common similarity attributes) and a combined set of data attributes (e.g., a combined set of similarity attributes). The amount of common data attributes may include a number of data attribute values in both a subset of data (e.g., ingested column of data) and a subset of a dataset disposed in a graph data arrangement. The combined set of data attributes may include a combined number of data attribute values over both the subset of data and the subset of the graph-based dataset. Further, an amount of common data attributes may include an intersection of values in Set P and one of Sets Q1 to Qn, and the combined set of data attributes may include a union of values in Set P and one of Sets Q1 to Qn. According to some examples, the above-described similarity attributes (or values thereof) may include "hash values," or hash values characterized by a particular parameter or metric (e.g., a minimum hash value as a target compressed data value). As such, determining an amount of overlap may be a function of, for example, a ratio between a number of matched hash-derived attributes (e.g., matched values in target hash values 358*a-n*, 371*a-n*, 373*a-n*, etc.), and a combined number of hash-derived attributes (e.g., combination of target hash values 358*a-n*, 371*a-n*, 373*a-n*, etc., with cardinality).

To determine a degree of similarity based on an "overlap" function, dataset joinability analyzer 360 may be configured to apply data values ("p") in column 356 (e.g., p=data values 356*a*, 356*b*, . . . , 356*n*) to a first hash function, "h(i)," in data compressors 355 to generate hash values 358*a*, 358*b*, . . . , 358*n* in set ("Set P") of compressed data representations 358. Generation of Set P, as a similarity signature 311, may be performed at ingestion (e.g., as ingested data 301*a* is received into dataset ingestion controller 320). Note that Set P may be subsequently stored in repository 340 for subsequent determinations of joinability and collaborative data uses. Similarly, dataset joinability analyzer 360 may be configured to apply data values ("q") in relevant subsets of graph data arrangements to the first hash function, "h(i)" to form hash values (not shown) from which target hash value

371a in Set Q1, target hash value 373a in Set Q2, etc., are derived. Note that Sets Q1 to Qn may be established or identified, as references with which to determine a degree of similarity, prior to ingestion of data 301a or the like, according to some examples.

Further, dataset joinability analyzer 360 may be configured to perform the overlap function by executing instructions of a similarity determination algorithm. As such, dataset joinability analyzer 360 may be configured to identify a minimum hash value ("H(P)") associated with hash values 351a, 351b, . . . , 351n in compressed data 351. In some cases, prior to ingestion of dataset 301a, dataset joinability analyzer 360 may be configured to identify a minimum hash value ("H(Q)"), such as minimum hash values 371a, 371b, and 371n in Sets Q1, 373a, 373b, and 373n in Q2, 375a, 375b, and 375n in Q3, and 371a, 371b, and 371n in Qn.

Dataset joinability analyzer 360 may analyze minimum hash value, H(P), of Set P and minimum hash value, H(Q), of any of Sets Q1, Q2, Q3, and Qn to determine or predict probabilistically whether Set P and one of Sets Q1, Q2, Q3, and Qn are similar or dissimilar. For example, dataset joinability analyzer 360 may be configured to compare a minimum hash value in Set P and a corresponding minimum hash value in Set Q (both which may be derived by a common hash function). If the minimum hash values are equal, then an overlap function may generate data representing one ("1") as a first state, which specifies that pre-hashed data values are determined to be in a common set (e.g., an intersection of set elements). Otherwise, if the minimum hash values are not equivalent (e.g., not within a range of values indicating equivalency), then the overlap function may generate data representing zero ("0") as a second state, which specifies that pre-hashed data values in Sets P and Q2 are disjoint. In at least one example, an overlap function may be expressed in the following relationship: OVER(P,Q)={1, if H(P)=H(Q); 0 otherwise}.

Further, dataset joinability analyzer 360 may be configured to compare minimum hash values H(P) and minimum hash values H(Q) for multiple sets of Set P and multiple sets of Set Q (e.g., one or more of Sets Q1, Q2, Q3, and Qn). For example, multiple different data compressors 355 each may implement any of a number of known hash functions (e.g., murmur hash function, md5 or variants, sha256 or variants, 2x+9 mod 5, 3x+3 mod 2, etc.) to generate Set P and multiple sets of Set Q. For example, 20 to 100 hash functions (or greater) may be implemented to generate corresponding sets of P and Q to determine whether hashed values of Set P and Set Q may yield either a first state ("1") or a second state ("0"). Thus, an amount of instances or computations yielding in a first state ("1") relative to an amount of instances a second state ("0") may specify a degree of similarity. For example, consider that 100 different hash functions are implemented. In a first subprocess, dataset joinability analyzer 360 may be configured to generate and compare 100 sets of minimum hash values H(P) in Set P and 100 sets of minimum hash values H(Q) in Set ("Q1") 371. In this case, consider that 37 hash functions generate a "state one" ("1") indication and 63 hash functions generate a "state zero" ("0") indication. Thus, a degree of similarity may be equivalent to a degree of overlap, which may be expressed as "37%." In a second subprocess, dataset joinability analyzer 360 may be configured to generate and compare 100 sets of minimum hash values H(P) in Set P and 100 sets of minimum hash values H(Q) in Set ("Q2") 373. In this case, consider that 89 hash functions generate a "state one" ("1") indication and 11 hash functions generate a "state zero" ("0") indication. Thus, a degree of similarity may be equivalent to a degree of overlap, which may be expressed as "89%." Similar subprocesses can be performed for other sets, such as between ingested Set P and Set ("Q3") 375, as well as between Set P and Set ("Qn") 377. In view of the above, Set Q2 has a greater degree of similarity with Set P (e.g., a degree of similarity of 89%) than Set Q1 does with Set P (e.g., a degree of similarity of 37%). Thus a dataset associated with Set Q2 may be more relevant than Set Q1, and, consequently, Set Q2 may have a greater degree of joinability than Set Q1.

According to some examples, minimum hash values H(P) and H(Q) may be described as unbiased estimators that approximate a fraction of a number of elements in an intersection of sets P and Q of a cardinal number of elements in a union of sets P and Q. In at least one example, a degree of similarity may be a function of, or equivalent to, a Jaccard distance. Further, an overlap function (e.g., the OVER(P,Q) function) may be implemented to include executable instructions to perform a minhash function or a variant thereof.

In alternate examples, degrees of similarity may be determined based on a "coverage" function. In particular, dataset joinability analyzer 360 may be configured to analyze one or more similarity matrices via execution of instructions to perform a coverage function. According to various embodiments, an amount of coverage may be determined by, for example, computing an approximated coverage of a set by another set based on a ratio between an amount of data attributes of a set and a combined set of data attributes (e.g., in at least two sets). The amount of data attributes may include a number of data attribute values in a subset of data (e.g., ingested column of data). The combined set of data attributes may include a combined number of data attribute values over both the subset of data and the subset of the graph-based dataset. Further, an amount of data attributes may include data attributes in Set P, and a combined set of data attributes may include a union of values in Set P and one of Sets Q1 to Qn. According to some examples, the above-described data attributes (or values thereof) may include "hash values."

In computing a "coverage" function, dataset joinability analyzer 360 may be configured to generate and compare minimum hash values H(P) and H(Q) similar to that in performing the above-described overlap function. By contrast, if a minimum hash value H(P) is less than or equal to a minimum hash value H(Q), then the coverage function may generate data representing one ("1") as a first state. Otherwise, then the coverage function may generate data representing zero ("0") as a second state. In at least one example, a coverage function may be expressed in the following relationship: COVER(P,Q)={1, if H(P)H(Q); 0 otherwise}. In at least one implementation, a coverage function may be configured to determine a probability that a minimum hash value for an ingested set of data, such as Set P, is covered by Set Q (e.g., a percentage of Set P covered by Set Q). According to various examples, a coverage function need not implement a minhash function, or may be configured to include a modified variation thereof. For some datasets, a coverage function may be implemented in lieu of a overlap function (or in conjunction therewith) to determine degrees of similarity with enhanced accuracy. For example, degrees of similarity using a coverage function may be computed with reduced computational resources and enhanced accuracy for datasets having large sizes and having a defined number of cardinal data values (or hash values). To illustrate, consider a set, such as Set P, including a number of zip codes in Texas, which may facilitate a relatively reduced Jaccard table or index, whereby a coverage function may be less influenced by the same. A large-sized dataset can be very large datasets, such as aggregations of 100,000 datasets to millions of datasets, or greater, whereby the datasets are disposed in graph data arrangement(s).

Similarity determination adjuster 365 may include logic configured to adjust the determinations of degrees of similarity based on one or more factors. In one example, implementation of a number of different hash functions may be variable. Hence, similarity determination adjuster 365 may be configured to adjust a number of different hash functions based on a type or class of data in ingested data 301a. In some examples, data representing a classification of data may be received into similarity determination adjuster 365 via data 303. For example, different number of hash functions in data compressors 355 may be implemented for "zip code data" relative to "geographic location data," or other data classifications or categories. Or, different hash functions may be implemented based on "string" data types rather than "boolean" data types, or based on "integer" data types rather than "float" data types (e.g., fewer and/or different hash functions may be used for integers rather than floating point data). Also, different number of hash functions in data compressors 355 may be implemented based on one or more dataset attributes, such as, but not limited to, annotations (e.g., metadata or descriptors describing columns, cells, or any portion of data), data classifications (e.g., a geographical location, such as a zip code, etc., or any descriptive data specifying a classification type or entity class), datatypes (e.g., string, numeric, categorical, boolean, integer, float, etc.), a number of data points, a number of columns, a "shape" or distribution of data and/or data values, and the like. In other examples, similarity determination adjuster 365 may include logic configured to adjust the determinations of degrees of similarity to include performance of either an "overlap" function or a "coverage" function, or both. In some cases, a degree of similarity may be determined based on results of the performance of overlap and coverage functions.

One or more links or associations may be formed between ingested columnar data 301 and a subset of a graph to form data files 390, whereby the one or more links or associations may be formed based on a degree of joinability of datasets (e.g., degrees of similarity between subsets of data).

Figure 4:
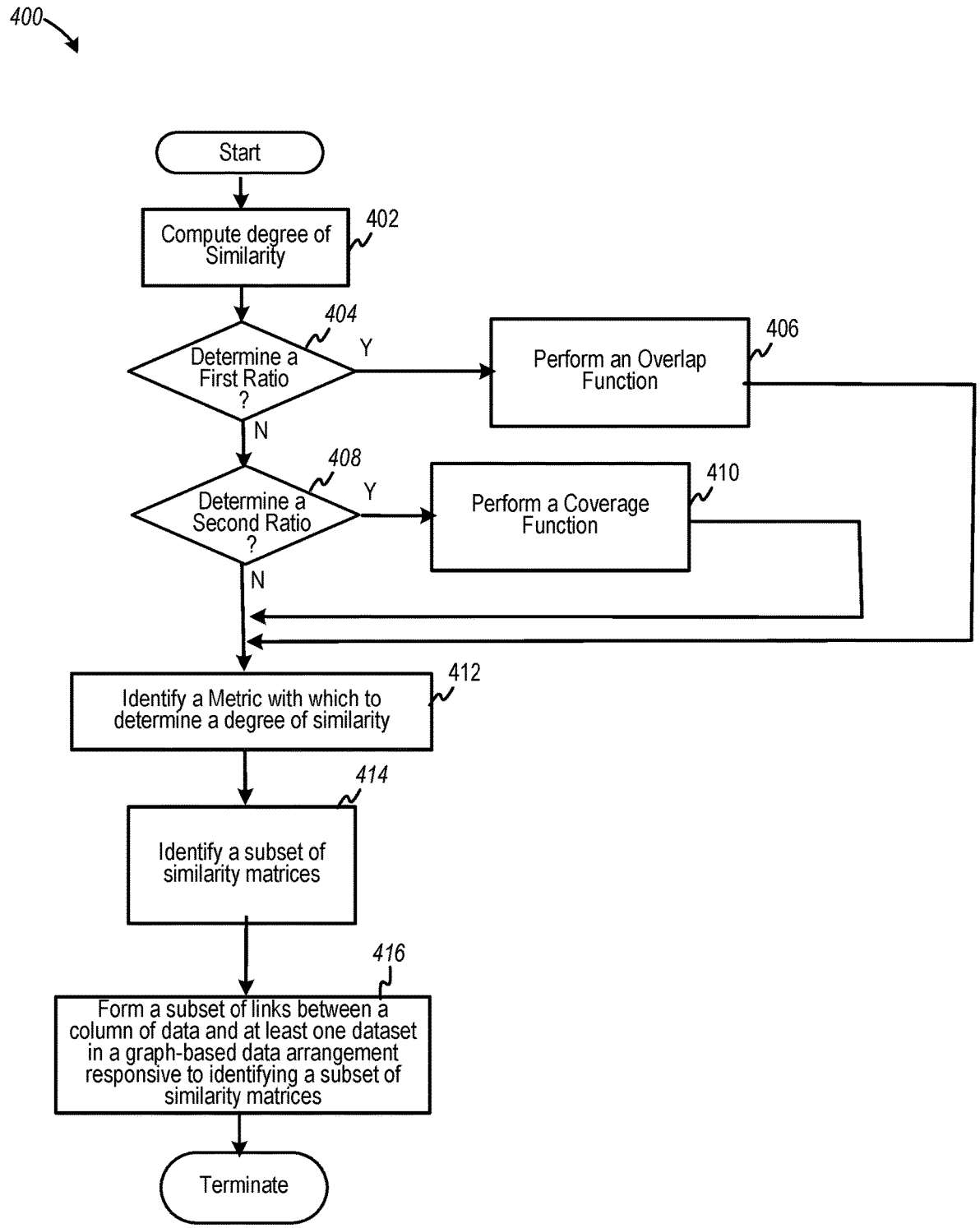
FIG. 4 is a flow diagram depicting another example of determining joinability of datasets with an ingested dataset, according to some embodiments.

FIG. 4 is a flow diagram depicting another example of determining joinability of datasets with an ingested dataset, according to some embodiments. In some examples, flow diagram 400 may be implemented in association with a collaborative dataset consolidation system, such as system 110 of FIG. 1. Further, flow diagram 400 may be facilitated, as a similarity determination algorithm, via computerized tools including a data project interface, which may be configured to initiate and/or execute instructions to identify data of an ingested dataset, such as a table, that may be relevant with one or more linked datasets stored in a graph-based data arrangement.

At 402, an indication is determined or otherwise identified to compute a degree of similarity at either 404 or 408, or via both. At 404, a determination may be made as to whether to determine a first ratio. If yes, flow 400 moves to 406 at which an overlap function may be performed. Otherwise, flow 400 may move to 408 at which a coverage function may be performed at 410. At 412, an optional metric may be identified with which to determine a degree of similarity. For example, a metric may include a threshold degree of similarity with which to, for example, distinguish and/or rank relevant subsets of graph-based data for expressing degrees of joinability. Degrees of similarity that exceed a threshold may be presented within, for example, a ranked hierarchy at a user interface. At 414, a subset of similarity matrices may be identified. The subset of similarity matrices being associated with corresponding subsets of graph data with which an ingested dataset may be joined. At 416, a subset of links may be formed between a column of data in at least one graph-based dataset, thereby enriching an ingested dataset based on computations of degrees of similarity.

Figure 5:
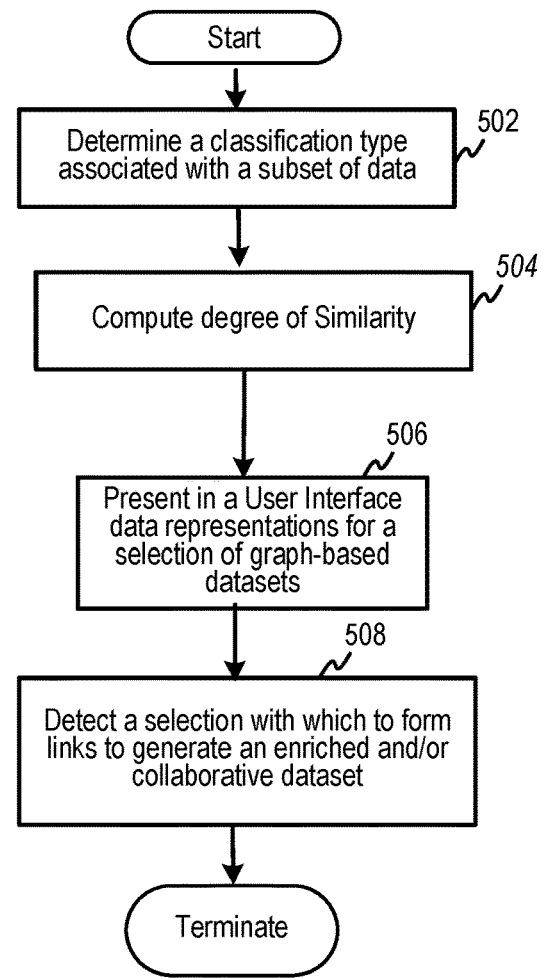
FIG. 5 is a flow diagram depicting an example of joining an ingested dataset via a degree of similarity for columnar data, according to some embodiments.

FIG. 5 is a flow diagram depicting an example of joining an ingested dataset via a degree of similarity for columnar data, according to some embodiments. In some examples, flow diagram 500 may be implemented in association with a collaborative dataset consolidation system, such as system 110 of FIG. 1. Further, flow diagram 500, as a similarity determination algorithm, may be facilitated via computerized tools including a data project interface, which may be configured to initiate and/or execute instructions to identify data of an ingested dataset, such as a table, that may be relevant with one or more linked datasets stored in a graph-based data arrangement.

At 502, a classification type associated with a subset of data may be determined. Based on a determine classification type, such as zip code data, one of a number of algorithms to compute one or more degrees of similarity may be performed at 504. At 506, data representations for selections of graph-based datasets may be presented in a user interface. The data representations may identify graph-based datasets as "joinable" to an ingested dataset based on compliant degrees of similarity (e.g., compliant with a threshold). In some cases, the data representations may be presented in a manner to convey a ranking or prioritization based on values for computer degrees of similarity. At 508, a selection may be detected with which to form links to generate an enriched and/or collaborative dataset. A selection may include a data signal that is received responsive to activation of user input at a user interface.

Figure 6:
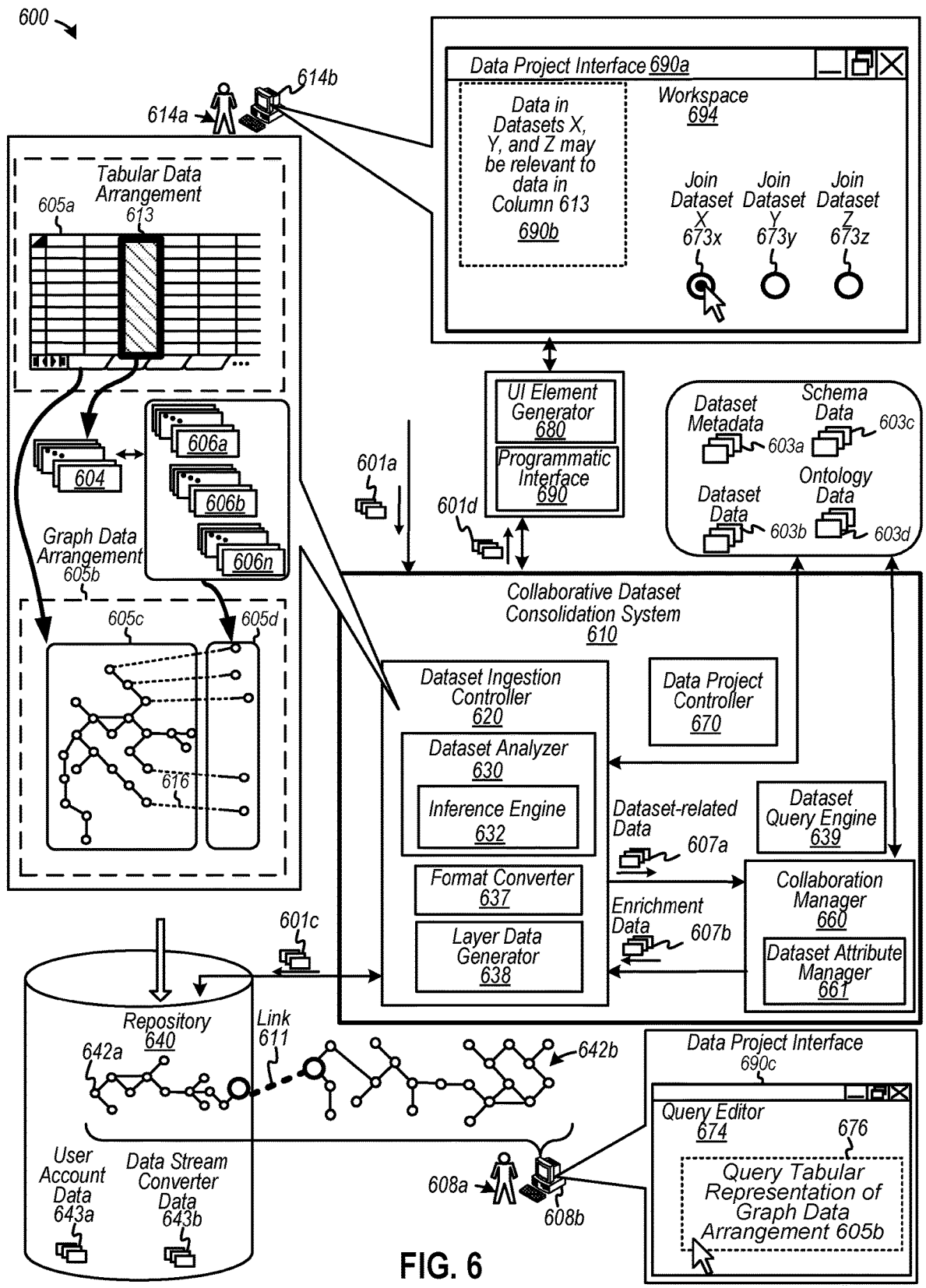
FIG. 6 is a diagram depicting another example of a collaborative dataset consolidation system configured to determine degrees of similarity among datasets to identify a dataset with which to join, according to some embodiments.

FIG. 6 is a diagram depicting another example of a collaborative dataset consolidation system configured to determine degrees of similarity among datasets to identify a dataset with which to join, according to some embodiments. Diagram 600 depicts an example of a collaborative dataset consolidation system 610 that may be configured to consolidate one or more datasets to form collaborative datasets as, for example, a canonical dataset. A collaborative dataset, according to some non-limiting examples, is a set of data that may be configured to facilitate data interoperability over disparate computing system platforms, architectures, and data storage devices. Further, a collaborative dataset may also be associated with data configured to establish one or more associations (e.g., metadata) among subsets of dataset attribute data for datasets and multiple layers of layered data, whereby attribute data may be used to determine correlations (e.g., data patterns, trends, etc.) among the collaborative datasets.

In some examples, data project controller 670 may be configured to control creation and evolution of a data project for managing collaborative datasets. Also, data project controller 670 may also initiate importation (e.g., ingestion) of dataset 605a via dataset ingestion controller 620. Implementation of data project controller 670 to access, modify, or improve a data project may be activated via a user account associated with a computing device 614b (and/or user 614a). Data representing the user account may be disposed in repository 640 as user account data 643a. In this example, computing device 614b and user 614a may each be identified as a creator or "owner" of a dataset and/or a data project. However, initiation of data project controller 670 to access, modify, or improve a data project may originate via another user account associated with a computing device 608b (and/or user 608a), who, as a collaborator, may access datasets, queries, and other data associated with a data project to perform additional analysis and information augmentation. In some examples, a collaborative computing device 608b may be configured to access a dataset derived as a function of matching or correlating a compressed data representation of column 613 of table 605a to one or more Bloom filters, as described herein.

Collaborative dataset consolidation system 610 may be configured to generate data for presentation in a display to form computerized tools in association with data project interface 690a, which is shown in this example to present notification 690b that datasets X, Y, and Z may be relevant to data in column 613 (e.g., based on degrees of similarity). Further, data project interface 690a also may present an interactive workspace interface portion 694. In some cases, the order of datasets may indicate a "ranking" in which dataset X may have a higher degree of joinability, whereas dataset Z may have a lower degree of joinability. Degrees of similarity may be determined based on a similarity matrix 604 formed based on data in column 613 and similarity matrices 606a to 606n formed based on subsets of graph data in graph data arrangement 642a and/or 642b. User inputs 673x to 673y in data project interface 609a may be configured to receive a selection of a dataset to join to data from dataset 605a. Consider that computing device 614b may be configured to initiate importation of a dataset 605a (e.g., in a tabular data arrangement) for conversion into a data project as a dataset 605b (e.g., in a graph data arrangement).

Dataset 605a may be ingested as data 601a, which may be received in the following examples of data formats: CSV, XML, JSON, XLS, MySQL, binary, free-form, unstructured data formats (e.g., data extracted from a PDF file using optical character recognition), etc., among others. Consider further that dataset ingestion controller 620 may receive data 601a representing a dataset 605a, which may be formatted as a "spreadsheet data file" that may include multiple tables associated with each tab of a spreadsheet, according to some examples. Dataset ingestion controller 620 may arrange data in dataset 605a into a first data arrangement, or may identify that data in dataset 605a is formatted in a particular data arrangement, such as in a first data arrangement. In this example, dataset 605a may be disposed in a tabular data arrangement that format converter 637 may convert into a second data arrangement, such as a graph data arrangement 605b. As such, data in a field (e.g., a unit of data in a cell at a row and column) of a table 605a may be disposed in association with a node in a graph 605b (e.g., a unit of data as linked data). A data operation (e.g., a query, or a "join" operation based on ranked datasets identified via degrees of similarity) may be applied as either a query against a tabular data arrangement (e.g., based on a relational data model) or graph data arrangement (e.g., based on a graph data model, such as using RDF). Since equivalent data are disposed in both a field of a table and a node of a graph, either the table or the graph may be used interchangeably to enrich or supplement an ingested dataset, as well as to perform queries and other data operations. Similarly, a dataset disposed in one or more other graph data arrangements may be disposed or otherwise mapped (e.g., linked) as a dataset into a tabular data arrangement.

Collaborative dataset consolidation system 610 is shown in this example to include a dataset ingestion controller 620, a collaboration manager 660 including a dataset attribute manager 661, a dataset query engine 639 configured to manage queries, and a data project controller 670. Dataset ingestion controller 620 may be configured to ingest and convert datasets, such as dataset 605a (e.g., a tabular data arrangement) into another data format, such as into a graph data arrangement 605b. Collaboration manager 660 may be configured to monitor updates to dataset attributes and other changes to a data project, and to disseminate the updates to a community of networked users or participants. Therefore, users 614a and 608a, as well as any other user or authorized participant, may receive communications, such as in an interactive collaborative activity feed (not shown) to discover new or recently-modified dataset-related information in real-time (or near real-time). In one example, user 608a may be notified via computing device 608b that dataset 605a is added and joined to dataset 605d, based on, for example, a degree of similarity. Thus, collaboration manager 660 and/or other portions of collaborative dataset consolidation system 610 may provide collaborative data and logic layers to implement a "social network" for datasets. Dataset attribute manager 661 may include logic configured to detect patterns in datasets, among other sources of data, whereby the patterns may be used to identify or correlate a subset of relevant datasets that may be linked or aggregated with a dataset. Linked datasets may form a collaborative dataset that may be enriched with supplemental information from other datasets. Dataset query engine 639 may be configured to receive a query to apply against a one or more datasets, which may include at least graph data arrangement 605b. In some examples, a query may be implemented as either a relational-based query (e.g., in an SQL-equivalent query language) or a graph-based query (e.g., in a SPARQL-equivalent query language), or a combination thereof. Further, a query may be implemented as either an implicit federated query or an explicit federated query.

According to some embodiments, a data project may be implemented as an augmented dataset as graph data arrangement 605b, which may include supplemental data responsive to joining dataset 605c (converted dataset 605a) to at least a portion of dataset 605d based on a degree of similarity between similarity matrix 604 and one of similarity matrices 606a to 606d. Graph data 605d associated with a matched reference compressed data representation may be linked or associated, via links 616, to graph data 605c (converted from table data arrangement 605a). In some examples, graph data arrangement 605b may be disposed in repository 640 as a graph-based dataset 642a, which, in turn, may be linked via link 611 to externally-accessible dataset 642b, which may be owned, created, and/or controlled by computing device 608b. In at least one example, a collaborative user 608a may access via a computing device 608b a data project interface 690c in which computing device 608b may activate a user input 676 in a query editor 674 to access one or more portions of dataset 642a, which may include graph data arrangement 605b, or portions thereof, such a graph data portion 605c and joined graph data portion 605d, whereby joined graph data portion 605d may be joined as a function of (responsive to) a degree of joinability and/or a degree of similarity, as described herein.

Note that in some examples, supplemental data or information may include, at least in some examples, information that may automatically convey (e.g., visually in text and/or graphics) dataset attributes of a created dataset or analysis of a query, including dataset attributes and derived dataset attributes, during or after (e.g., shortly thereafter) the creation or querying of a dataset. In some examples, supplemental data or information may be presented as dataset attributes in a user interface (e.g., responsive to dataset creation) may describe various aspects of a dataset, such as dataset attributes, in summary form, such as, but not limited to, annotations (e.g., metadata or descriptors describing columns, cells, or any portion of data), data classifications (e.g., a geographical location, such as a zip code, etc., or any descriptive data specifying a classification type or entity class), datatypes (e.g., string, numeric, categorical, boolean, integer, etc.), a number of data points, a number of columns, a "shape" or distribution of data and/or data values, a number of empty or non-empty cells in a tabular data structure, a number of non-conforming data (e.g., a non-numeric data value in column expecting a numeric data, an image file, etc.) in cells of a tabular data structure, a number of distinct values, as well as other dataset attributes.

Dataset analyzer 630 may be configured to analyze data file 601a, as an ingested dataset 605a, to detect and resolve data entry exceptions (e.g., whether a cell is empty or includes non-useful data, whether a cell includes non-conforming data, such as a string in a column that otherwise includes numbers, whether an image embedded in a cell of a tabular file, whether there are any missing annotations or column headers, etc.). Dataset analyzer 630 then may be configured to correct or otherwise compensate for such exceptions. Dataset analyzer 630 also may be configured to classify subsets of data (e.g., each subset of data as a column of data) in data file 601a representing tabular data arrangement 605a as a particular data classification, such as a particular data type or classification. For example, a column of integers may be classified as "year data," if the integers are formatted similarly as a number of year formats expressed in accordance with a Gregorian calendar schema. Thus, "year data" may be formed as a derived dataset attribute for the particular column. As another example, if a column includes a number of cells that each includes five digits, dataset analyzer 630 also may be configured to classify the digits as constituting a "zip code." According to some examples, dataset analyzer 630 may be configured to classify data as classification type or entity class based on detecting a match or correlation between a compressed data representation 604 and at least one of probabilistic data structures 606a to 606d.

In some examples, an inference engine 632 of dataset analyzer 630 can be configured to analyze data file 601a to determine correlations among dataset attributes of data file 601a and other datasets 642b (and dataset attributes, such as metadata 603a). Once a subset of correlations has been determined, a dataset formatted in data file 601a (e.g., as an annotated tabular data file, or as a CSV file) may be enriched, for example, by associating links between tabular data arrangement 605a and other datasets (e.g., by joining with, or linking to, other datasets) to extend the data beyond that which is in data file 601a. In one example, inference engine 632 may analyze a column of data to infer or derive a data classification for the data in the column. In some examples, a datatype, a data classification, etc., as well any dataset attribute, may be derived based on known data or information (e.g., annotations), or based on predictive inferences using patterns in data.

Further to diagram 600, format converter 637 may be configured to convert dataset 605a into another format, such as a graph data arrangement 642a, which may be transmitted as data 601c for storage in data repository 640. Graph data arrangement 642a in diagram 600 may be linkable (e.g., via links 611) to other graph data arrangements to form a collaborative dataset. Also, format converter 637 may be configured to generate ancillary data or descriptor data (e.g., metadata) that describe attributes associated with each unit of data in dataset 605a. The ancillary or descriptor data can include data elements describing attributes of a unit of data, such as, for example, a label or annotation (e.g., header name) for a column, an index or column number, a data type associated with the data in a column, etc. In some examples, a unit of data may refer to data disposed at a particular row and column of a tabular arrangement (e.g., originating from a cell in dataset 605a). In some cases, ancillary or descriptor data may be used by inference engine 632 to determine whether data may be classified into a certain classification, such as where a column of data includes "zip codes." In some examples, tabular dataset 605a may be converted into a graph-based dataset 605c, which may be joined via links 616 to graph-based dataset 605d based on a degree of joinability and/or a degree of similarity, as described herein.

Layer data generator 636 may be configured to form linkage relationships of ancillary data or descriptor data to data in the form of "layers" or "layer data files." Implementations of layer data files may facilitate the use of supplemental data (e.g., derived or added data, etc.) that can be linked to an original source dataset, whereby original or subsequent data may be preserved. As such, format converter 637 may be configured to form referential data (e.g., IRI data, etc.) to associate a datum (e.g., a unit of data) in a graph data arrangement to a portion of data in a tabular data arrangement. Thus, data operations, such as a query, may be applied against a datum of the tabular data arrangement as the datum in the graph data arrangement. An example of a layer data generator 636, as well as other components of collaborative dataset consolidation system 610, may be as described in U.S. patent application Ser. No. 15/927,004, filed on Mar. 20, 2018, and titled "LAYERED DATA GENERATION AND DATA REMEDIATION TO FACILITATE FORMATION OF INTERRELATED DATA IN A SYSTEM OF NETWORKED COLLABORATIVE DATASETS."

According to some embodiments, a collaborative data format may be configured to, but need not be required to, format converted dataset 605a into an atomized dataset. An atomized dataset may include a data arrangement in which data is stored as an atomized data point that, for example, may be an irreducible or simplest data representation (e.g., a triple is a smallest irreducible representation for a binary relationship between two data units) that are linkable to other atomized data points, according to some embodiments. As atomized data points may be linked to each other, data arrangement 642a may be represented as a graph, whereby converted dataset 605a (i.e., atomized dataset 605b) may form a portion of a graph. In some cases, an atomized dataset facilitates merging of data irrespective of whether, for example, schemas or applications differ. Further, an atomized data point may represent a triple or any portion thereof (e.g., any data unit representing one of a subject, a predicate, or an object), according to at least some examples.

As further shown, collaborative dataset consolidation system 610 may include a dataset attribute manager 661. Dataset ingestion controller 620 and dataset attribute manager 661 may be communicatively coupled to dataset ingestion controller 620 to exchange dataset-related data 607a and enrichment data 607b, both of which may exchange data from a number of sources (e.g., external data sources) that may include dataset metadata 603a (e.g., descriptor data or information specifying dataset attributes), dataset data 603b (e.g., some or all data stored in system repositories 640, which may store graph data), schema data 603c (e.g., sources, such as schema.org, that may provide various types and vocabularies), ontology data 603d from any suitable ontology and any other suitable types of data sources. Ontology data 603d may include proprietary data unique to a certain organization and may be secured to prevent public access. One or more elements depicted in diagram 600 of FIG. 6 may include structures and/or functions as similarly-named or similarly-numbered elements depicted in other drawings, or as otherwise described herein, in accordance with one or more examples. Dataset attribute manager 661 may be configured to monitor changes in dataset data and/or attributes, including user account attributes. As such, dataset attribute manager 660 may monitor dataset attribute changes, such as a change in number or identity of users sharing a dataset, as well as whether a dataset has been created, modified, linked, updated, associated with a comment, associated with a request, queried, or has been associated with any other dataset interactions. Dataset attribute manager 661 may also monitor and correlate data among any number of datasets, some other examples of dataset attributes.

In the example shown if FIG. 6, dataset ingestion controller 620 may be communicatively coupled to a user interface, such as data project interface 690a, via one or both of a user interface ("UP") element generator 680 and a programmatic interface 690 to exchange data and/or commands (e.g., executable instructions) for facilitating data project modification to include dataset 605a. UI element generator 680 may be configured to generate data representing UI elements to facilitate the generation of data project interfaces 690a and 690b and graphical elements thereon. For example, UI generator 680 may cause generation UI elements, such as a container window (e.g., icon to invoke storage, such as a file), a browser window, a child window (e.g., a pop-up window), a menu bar (e.g., a pull-down menu), a context menu (e.g., responsive to hovering a cursor over a UI location), graphical control elements (e.g., user input buttons, check boxes, radio buttons, sliders, etc.), and other control-related user input or output UI elements. In some examples, a data project interface, such as data project interface 690a or data project interface 690b, may be implemented as, for example, a unitary interface window in which multiple user inputs may provide access to numerous aspects of forming or managing a data project, according to a non-limiting example.

Programmatic interface 690 may include logic configured to interface collaborative dataset consolidation system 610 and any computing device configured to present data 601d via, for example, any network, such as the Internet. In one example, programmatic interface 690 may be implemented to include an applications programming interface ("API") (e.g., a REST API, etc.) configured to use, for example, HTTP protocols (or any other protocols) to facilitate electronic communication. In one example, programmatic interface 690 may include a web data connector, and, in some examples, may include executable instructions to facilitate data exchange with, for example, a third-party external data analysis computerized tool. A web connector may include data stream converter data 643b, which, for example, may include HTML code to couple a user interface 690a with an external computing device to Examples of external applications and/or programming languages to perform external statistical and data analysis include "R," which is maintained and controlled by "The R Foundation for Statistical Computing" at www(dot)r-project(dot)org, as well as other like languages or packages, including applications that may be integrated with R (e.g., such as MATLAB™, Mathematica™ etc.). Or, other applications, such as Python programming applications, MATLAB™, Tableau® application, etc., may be used to perform further analysis, including visualization or other queries and data manipulation.

According to some examples, user interface ("UI") element generator 680 and a programmatic interface 690 may be implemented in association with collaborative dataset consolidation system 610, in a computing device associated with data project interfaces 690a and 690b (and/or 690c), or a combination thereof. UI element generator 680 and/or programmatic interface 690 may be referred to as computerized tools, or may facilitate presentation of data 601d to form data project interface 690a, or the like, as a computerized tool, according to some examples.

In at least one example, identifying additional datasets to enhance dataset 642a may be determined through collaborative activity, such as identifying that a particular dataset may be relevant to dataset 642a based on electronic social interactions among datasets and users. For example, data representations of other relevant dataset to which links may be formed may be made available via an interactive collaborative dataset activity feed. An interactive collaborative dataset activity feed may include data representing a number of queries associated with a dataset, a number of dataset versions, identities of users (or associated user identifiers) who have analyzed a dataset, a number of user comments related to a dataset, the types of comments, etc.). Thus, dataset 642a may be enhanced via "a network for datasets" (e.g., a "social" network of datasets and dataset interactions). While "a network for datasets" need not be based on electronic social interactions among users, various examples provide for inclusion of users and user interactions (e.g., social network of data practitioners, etc.) to supplement the "network of datasets." In one example, collaborative dataset consolidation system 610 may be configured to detect formation of a link to supplemental data in a portion of dataset 642b, which may be associated with a user account (e.g., described in user account data 643a) and managed by computing device 608b. Further, collaborative dataset consolidation system 610 may generate a notification via network to transmit to computing device 608b so that user 608a may be informed, via a dataset activity feed, that activity has occurred with one of its datasets. Hence, collaboration among distributed datasets may be facilitated.

According to various embodiments, one or more structural and/or functional elements described in FIG. 6 or herein may be implemented in hardware or software, or both. Examples of one or more structural and/or functional elements described herein may be implemented as set forth in one or more of U.S. patent application Ser. No. 15/186,514, filed on Jun. 19, 2016, and titled "COLLABORATIVE DATASET CONSOLIDATION VIA DISTRIBUTED COMPUTER NETWORKS," U.S. patent application Ser. No. 15/186,517, filed on Jun. 19, 2016, and titled "QUERY GENERATION FOR COLLABORATIVE DATASETS," and U.S. patent application Ser. No. 15/454,923, filed on Mar. 9, 2017, and titled "COMPUTERIZED TOOLS TO DISCOVER, FORM, AND ANALYZE DATASET INTERRELATIONS AMONG A SYSTEM OF NETWORKED COLLABORATIVE DATASETS," each of which is herein incorporated by reference.

Figure 7:
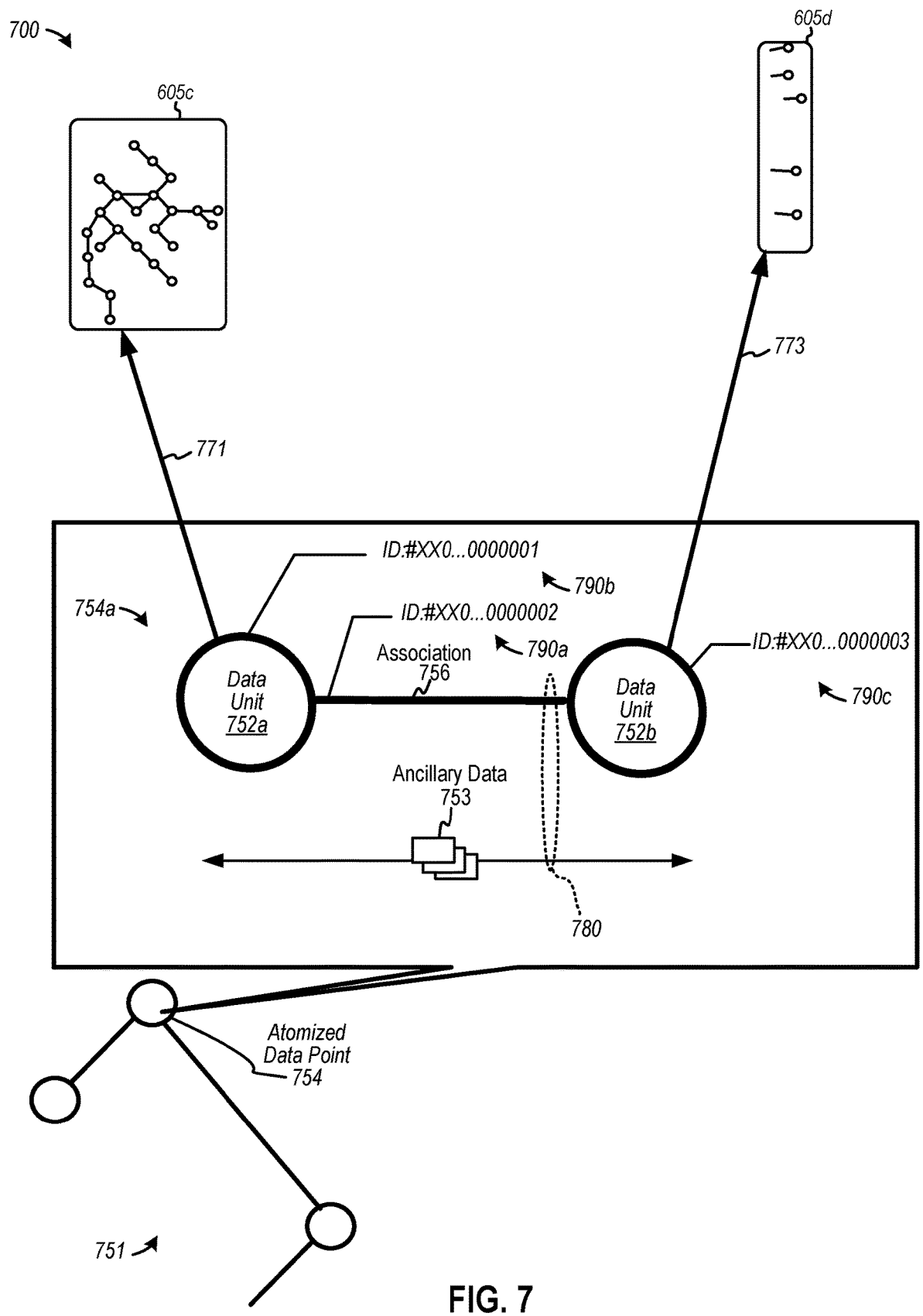
FIG. 7 is a diagram depicting an example of an atomized data point joining datasets based on a degree of similarity.

FIG. 7 is a diagram depicting an example of an atomized data point joining datasets based on a degree of similarity, according to some embodiments. In some examples, an atomized dataset may be formed by converting a tabular data format into a format associated with the atomized dataset. In some cases, portion 751 of an atomized dataset can describe a portion of a graph that includes one or more subsets of linked data. Further to diagram 700, one example of atomized data point 754 is shown as a data representation 754a, which may be represented by data representing two data units 752a and 752b (e.g., objects) that may be associated via data representing an association 756 with each other. One or more elements of data representation 754a may be configured to be individually and uniquely identifiable (e.g., addressable), either locally or globally in a namespace of any size. For example, elements of data representation 754a may be identified by identifier data 790a, 790b, and 790c (e.g., URIs, URLs, IRIs, etc.).

Diagram 700 depicts a portion 751 of an atomized dataset that includes an atomized data point 754a, which includes links formed to facilitate identifying relevant data of an ingested dataset with one or more linked datasets, according to some examples. In this example, atomized data point 754a an (e.g., join) supplemental data to a dataset responsive to detecting a match between compressed data representations and one or more match filters (e.g., one or more Bloom filters). The data representing the identifiers may be disposed within a corresponding graph data arrangement based on a graph data model. In diagram 700, graph data portion 605c of FIG. 6 may be linked via link 771 to node 752a, which, in turn, may be linked from node 752b via link 773 to graph data portion 605d of FIG. 6, which may be a remote or external dataset. Any of links 771 and 773 may be removed if a corresponding dataset identifier is disassociated from a data project. In some examples, removal of one of links 771 and 773 may generate a new version of a data project, whereby the removed link may be preserved for at least archival purposes. Note, too, that while a first entity (e.g., a dataset owner) may exert control and privileges over portion 751 of an atomized dataset that includes atomized data point 754, a collaborator-user or a collaborator-computing device may form any of links 771 and 773. In one example, data units 752a and 752b may represent any of nodes depicted in 605b in FIG. 6, according to at least one implementation.

In some embodiments, atomized data point 754a may be associated with ancillary data 753 to implement one or more ancillary data functions. For example, consider that association 756 spans over a boundary between an internal dataset, which may include data unit 752a, and an external dataset (e.g., external to a collaboration dataset consolidation), which may include data unit 752b. Ancillary data 753 may interrelate via relationship 780 with one or more elements of atomized data point 754a such that when data operations regarding atomized data point 754a are implemented, ancillary data 753 may be contemporaneously (or substantially contemporaneously) accessed to influence or control a data operation. In one example, a data operation may be a query and ancillary data 753 may include data representing authorization (e.g., credential data) to access atomized data point 754a at a query-level data operation (e.g., at a query proxy during a query). Thus, atomized data point 754a can be accessed if credential data related to ancillary data 753 is valid (otherwise, a request to access atomized data point 754a (e.g., for forming linked datasets, performing analysis, a query, or the like) without authorization data may be rejected or invalidated). According to some embodiments, credential data (e.g., passcode data), which may or may not be encrypted, may be integrated into or otherwise embedded in one or more of identifier data 790a, 790b, and 790c. Ancillary data 753 may be disposed in other data portion of atomized data point 754a, or may be linked (e.g., via a pointer) to a data vault that may contain data representing access permissions or credentials.

Atomized data point 754a may be implemented in accordance with (or be compatible with) a Resource Description Framework ("RDF") data model and specification, according to some embodiments. An example of an RDF data model and specification is maintained by the World Wide Web Consortium ("W3C"), which is an international standards community of Member organizations. In some examples, atomized data point 754a may be expressed in accordance with Turtle (e.g., Terse RDF Triple Language), RDF/XML, N-Triples, N3, or other like RDF-related formats. As such, data unit 752a, association 756, and data unit 752b may be referred to as a "subject," "predicate," and "object," respectively, in a "triple" data point (e.g., as linked data). In some examples, one or more of identifier data 790a, 790b, and 790c may be implemented as, for example, a Uniform Resource Identifier ("URI"), the specification of which is maintained by the Internet Engineering Task Force ("IETF"). According to some examples, credential information (e.g., ancillary data 753) may be embedded in a link or a URI (or in a URL) or an Internationalized Resource Identifier ("IRI") for purposes of authorizing data access and other data processes. Therefore, an atomized data point 754 may be equivalent to a triple data point of the Resource Description Framework ("RDF") data model and specification, according to some examples. Note that the term "atomized" may be used to describe a data point or a dataset composed of data points represented by a relatively small unit of data. As such, an "atomized" data point is not intended to be limited to a "triple" or to be compliant with RDF; further, an "atomized" dataset is not intended to be limited to RDF-based datasets or their variants. Also, an "atomized" data store is not intended to be limited to a "triplestore," but these terms are intended to be broader to encompass other equivalent data representations.

Examples of triplestores suitable to store "triples" and atomized datasets (or portions thereof) include, but are not limited to, any triplestore type architected to function as (or similar to) a BLAZEGRAPH triplestore, which is developed by Systap, LLC of Washington, D.C., U.S.A.), any triplestore type architected to function as (or similar to) a STARDOG triplestore, which is developed by Complexible, Inc. of Washington, D.C., U.S.A.), any triplestore type architected to function as (or similar to) a FUSEKI triplestore, which may be maintained by The Apache Software Foundation of Forest Hill, MD, U.S.A.), and the like.

Figure 8:
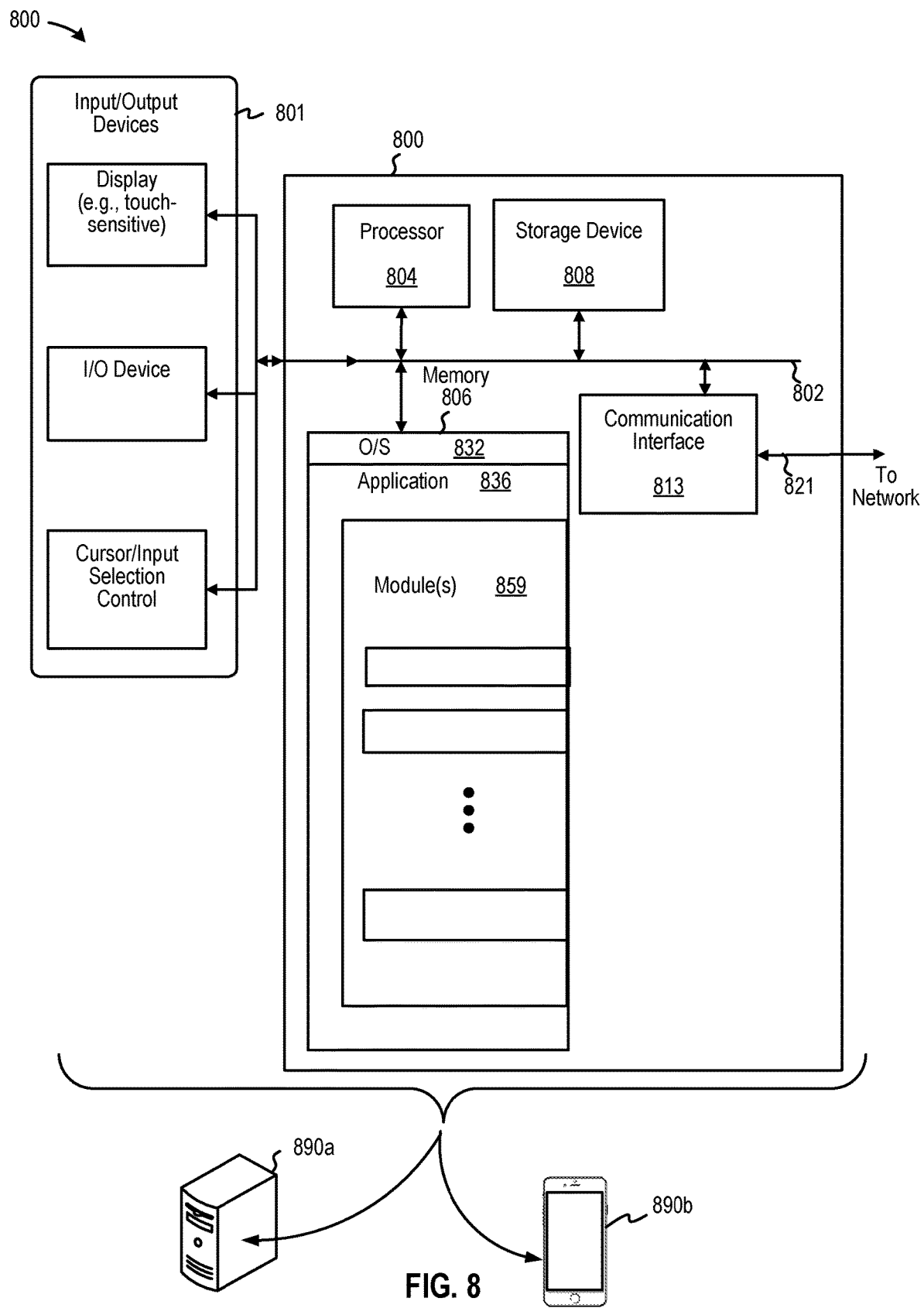
FIG. 8 illustrates examples of various computing platforms configured to provide various functionalities to any of one or more components of a collaborative dataset consolidation system, according to various embodiments.

FIG. 8 illustrates examples of various computing platforms configured to provide various functionalities to any of one or more components of a collaborative dataset consolidation system, according to various embodiments. In some examples, computing platform 800 may be used to implement computer programs, applications, methods, processes, algorithms, or other software, as well as any hardware implementation thereof, to perform the above-described techniques.

In some cases, computing platform 800 or any portion (e.g., any structural or functional portion) can be disposed in any device, such as a computing device 890a, mobile computing device 890b, and/or a processing circuit in association with initiating the formation of collaborative datasets, as well as identifying relevant data of an ingested dataset with one or more linked datasets, according to various examples described herein.

Computing platform 800 includes a bus 802 or other communication mechanism for communicating information, which interconnects subsystems and devices, such as processor 804, system memory 806 (e.g., RAM, etc.), storage device 808 (e.g., ROM, etc.), an in-memory cache (which may be implemented in RAM 806 or other portions of computing platform 800), a communication interface 813 (e.g., an Ethernet or wireless controller, a Bluetooth controller, NFC logic, etc.) to facilitate communications via a port on communication link 821 to communicate, for example, with a computing device, including mobile computing and/or communication devices with processors, including database devices (e.g., storage devices configured to store atomized datasets, including, but not limited to triplestores, etc.). Processor 804 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 800 exchanges data representing inputs and outputs via input-and-output devices 801, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 801 may be implemented as, or otherwise substituted with, a user interface in a computing device associated with a user account identifier in accordance with the various examples described herein.

According to some examples, computing platform 800 performs specific operations by processor 804 executing one or more sequences of one or more instructions stored in system memory 806, and computing platform 800 can be implemented in a client-server arrangement, peer-to-peer arrangement, or as any mobile computing device, including smart phones and the like. Such instructions or data may be read into system memory 806 from another computer readable medium, such as storage device 808, or any other data storage technologies, including blockchain-related techniques. In some examples, hard-wired circuitry may be used in place of or in combination with software instructions for implementation. Instructions may be embedded in software or firmware. The term "computer readable medium" refers to any tangible medium that participates in providing instructions to processor 804 for execution. Such a medium may take many forms, including but not limited to, non-volatile media and volatile media. Non-volatile media includes, for example, optical or magnetic disks and the like. Volatile media includes dynamic memory, such as system memory 806.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 802 for transmitting a computer data signal.

In some examples, execution of the sequences of instructions may be performed by computing platform 800. According to some examples, computing platform 800 can be coupled by communication link 821 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 800 may transmit and receive messages, data, and instructions, including program code (e.g., application code) through communication link 821 and communication interface 813. Received program code may be executed by processor 804 as it is received, and/or stored in memory 806 or other non-volatile storage for later execution.

In the example shown, system memory 806 can include various modules that include executable instructions to implement functionalities described herein. System memory 806 may include an operating system ("O/S") 832, as well as an application 836 and/or logic module(s) 859. In the example shown in FIG. 8, system memory 806 may include any number of modules 859, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. In some examples, the described techniques may be implemented as a computer program or application (hereafter "applications") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including Python™, ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, JSON, Javascript™, Ajax, Perl, COBOL, Fortran, ADA, XML, MXML, HTML, DHTML, XHTML, HTTP, XMPP, PHP, and others, including SQL™, SPARQL™, Turtle™, etc. The described techniques may be varied and are not limited to the embodiments, examples or descriptions provided.

As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 859 of FIG. 8, or one or more of their components, or any process or device described herein, can be in communication (e.g., wired or wirelessly) with a mobile device, such as a mobile phone or computing device, or can be disposed therein. In some cases, a mobile device, or any networked computing device (not shown) in communication with one or more modules 859 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided. Further, none of the above-described implementations are abstract, but rather contribute significantly to improvements to functionalities and the art of computing devices.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method, comprising:
   ingesting a dataset to form an ingested dataset;
   compressing the ingested dataset in accordance with at least one of one or more algorithmic hash functions to form a compressed data representation of the ingested data, the at least one of the one or more algorithmic hash functions including a plurality of differently-configured hash functions to generate a first subset of instances in a first state relative to a second subset of instances in a second state to specify a degree of similarity, the plurality of the differently-configured hash functions being configured to generate a plurality of hash values, at least one of the plurality of differently-configured hash functions being implemented based on a data type;
   identifying an indication associated with instructing computation of the degree of similarity between the ingested dataset and another dataset, the degree of similarity being used to join the dataset and the another dataset in a graph in response to executing instructions at one or more processors;
   determining a first ratio associated with an overlap function;
   determining a second ratio associated with a coverage function;
   identifying a metric configured to be used to determine the degree of similarity;
   associating a subset of similarity matrices with a subset of graph data joined to the ingested dataset;
   accessing the subset of similarity matrices, at least one subset of a similarity matrix is formed to identify a subset of relevant data associated with the another dataset disposed in a graph data arrangement, at least a portion of the another dataset in the graph data arrangement being formatted as one or more triple-based data formats, the similarity matrix and the degree of similarity being a function of the plurality of the hash values relating to a union of compressed ingested dataset data and compressed target data;
   forming a plurality of links among a column of data associated with the ingested dataset as the dataset and the another dataset of the ingested data, the plurality of links being determined based on the degree of similarity based on the compressed data representation; and
   receiving a query as a data operation based on ranked datasets identified based on the degree of similarity and other degrees of similarity,
   wherein a combined number of hash-derived attributes of the at least one of one or more algorithmic hash functions are configured to determine the degree of similarity based on multiple algorithmic hash functions.

2. The method of claim 1, wherein the determining the second ratio is determined if the overlap function is not performed.

3. The method of claim 1, wherein the determining the first ratio indicates the coverage function is not performed.

4. The method of claim 1, wherein the metric comprises a threshold degree of similarity configured to distinguish the dataset from the another dataset to identify a degree of joinability.

5. The method of claim 1, wherein the metric comprises a threshold degree of similarity configured to generate a ranking including the dataset and the another dataset.

6. The method of claim 1, wherein the metric comprises a threshold degree of similarity configured to generate a ranking including the dataset and the another dataset, the ranking being used to identify one or more degree of joinability between the dataset and the another dataset.

7. The method of claim 1, wherein the metric comprises a threshold degree of similarity configured to generate a ranking including the dataset and the another dataset, the ranking being used to identify one or more degree of joinability between the dataset and the another dataset to identify one or more of the plurality of links.

8. The method of claim 1, wherein the dataset is configured to be presented in a display if the degree of similarity exceeds a threshold.

9. The method of claim 1, wherein the another dataset is configured to be presented in a display if the degree of similarity exceeds a threshold.

10. The method of claim 1, further comprising analyzing the dataset and the another dataset to determine joinability if the degree of similarity is compliant.

11. The method of claim 1, wherein the degree of similarity is compliant and the dataset and the another dataset are identified as joinable.

12. The method of claim 1, wherein the degree of similarity is configured to identify a priority associated with the dataset and another priority associated with the another dataset, the priority and the another priority being used to form the plurality of links.

13. A method, comprising:
ingesting a dataset to form an ingested dataset;
compressing the ingested dataset in accordance with at least one of one or more algorithmic hash functions to form a compressed data representation of the ingested data, the at least one of the one or more algorithmic hash functions including a plurality of differently-configured hash functions to generate a first subset of instances in a first state relative to a second subset of instances in a second state to specify a degree of similarity, the plurality of hash functions being configured to generate a plurality of hash values, at least one of the plurality of differently-configured hash functions being implemented based on a data type;
evaluating the ingested data including a dataset and another dataset to identify one or more links to other datasets stored in a graph;
using a similarity determination algorithm to identify the degree of similarity between the dataset, the another dataset, and the other datasets to determine joinability of the dataset, the another dataset, and the other datasets in the graph, the similarity determination algorithm including executable instructions processed at one or more processors;
determining a ratio, the ratio being used to determine whether to perform a function;
associating a subset of similarity matrices with a subset of graph data joined to the ingested dataset;
accessing the subset of similarity matrices, at least one subset of a similarity matrix is formed to identify a subset of relevant data associated with the another dataset disposed in a graph data arrangement, at least a portion of the another dataset in the graph data arrangement being formatted as one or more triple-based data formats, the similarity matrix and the degree of similarity being a function of the plurality of the hash values relating to a union of compressed ingested dataset data and compressed target data;
forming a plurality of links among a column of data associated with the ingested dataset as the dataset and the another dataset of the ingested data, the plurality of links being determined based on the degree of similarity based on the compressed data representation; and
receiving a query as a data operation based on ranked datasets identified based on the degree of similarity and other degrees of similarity,
wherein a combined number of hash-derived attributes of the at least one of one or more algorithmic hash functions are configured to determine the degree of similarity based on multiple algorithmic hash functions.

14. The method of claim 13, wherein the similarity determination algorithm is configured to use a metric to determine the degree of similarity.

15. The method of claim 13, wherein the function is an overlap function.

16. The method of claim 13, wherein the function is a coverage function.

17. A system, comprising:
a data repository including memory configured to store data associated with a graph stored in a data arrangement with which at least a portion is configured to store graph-based data arrangements; and
a collaborative dataset consolidation system including one or more processors configured to ingest a dataset to form an ingested dataset, compress the ingested dataset in accordance with at least one of one or more algorithmic hash functions to form a compressed data representation of the ingested data, the at least one of the one or more algorithmic hash functions including a plurality of differently-configured hash functions to generate a first subset of instances in a first state relative to a second subset of instances in a second state to specify a degree of similarity, the plurality of hash functions being configured to generate a plurality of hash values, at least one of the plurality of differently-configured hash functions being implemented based on a data type, evaluate the ingested data including a dataset and another dataset to identify one or more links to other datasets stored in a graph, to use a similarity determination algorithm to identify the degree of similarity between the dataset, the another dataset, and the other datasets to determine joinability of the dataset, the another dataset, and the other datasets in the graph, to determine a ratio, the ratio being used to determine whether to perform a function, to associate a subset of similarity matrices with a subset of graph data joined to the ingested dataset, access the subset of similarity matrices, at least one subset of a similarity matrix is formed to identify a subset of relevant data associated with the another dataset disposed in a graph data arrangement, at least a portion of the another dataset in the graph data arrangement being formatted as one or more triple-based data formats, the similarity matrix and the degree of similarity being a function of the plurality of the hash values relating to a union of compressed ingested dataset data and compressed target data; to form a plurality of links among a column of data between the ingested dataset and the another dataset, the plurality of links being determined based on the degree of similarity based on the compressed data representation, and to receive a query as a data operation based on ranked datasets identified based on the degree of similarity and other degrees of similarity,
wherein a combined number of hash-derived attributes of the at least one of one or more algorithmic hash functions are configured to determine the degree of similarity based on multiple algorithmic hash functions.

18. The system of claim 17, wherein a dataset ingestion controller is configured to evaluate the ingested data including the dataset and the another dataset.

19. The system of claim 17, wherein the plurality of links are formed between the dataset and the another dataset generating referential data in a graph data arrangement.

20. The system of claim 17, wherein the collaborative dataset consolidation system is configured to generate referential data stored in a graph data arrangement comprising a datum, the datum being configured to identify a degree of similarity between the dataset and the another dataset based on the degree of similarity determined by the similarity determination algorithm.

\* \* \* \* \*